US008391336B2

(12) United States Patent
Chiskis

(10) Patent No.: US 8,391,336 B2
(45) Date of Patent: Mar. 5, 2013

(54) VARIABLE LENGTH RANGING AND DIRECTION-FINDING SIGNALS CONSTRUCTED FROM BANDLIMITED KERNELS AND SPARSE SPREADING SEQUENCES

(75) Inventor: Alex Chiskis, Tel Aviv (IL)

(73) Assignee: A.P.M. Automation Solutions Ltd, Tel Aviv (IL)

( * ) Notice: Subject to any disclaimer, the term of this patent is extended or adjusted under 35 U.S.C. 154(b) by 197 days.

(21) Appl. No.: 13/041,461

(22) Filed: Mar. 7, 2011

(65) Prior Publication Data

US 2012/0230371 A1    Sep. 13, 2012

(51) Int. Cl.
*H04B 1/00* (2006.01)
(52) U.S. Cl. ........ 375/146; 375/130; 375/140; 375/141; 375/142; 375/143; 375/147; 375/150; 375/152; 375/219; 375/220; 375/295; 375/316; 342/21; 342/25; 342/70; 342/71; 342/72; 342/128; 342/130; 342/132; 342/175; 342/194; 342/195; 342/196; 342/200; 342/201; 342/202; 370/320; 370/334; 370/335; 370/342; 370/343
(58) Field of Classification Search .................. 375/130, 375/140, 141, 142, 143, 146, 147, 150, 152, 375/219, 220, 295, 316; 342/21, 25, 70, 342/71, 72, 128, 130, 132, 175, 194, 195, 342/196, 200, 201, 202; 370/320, 334, 335, 370/342, 343
See application file for complete search history.

(56) References Cited

U.S. PATENT DOCUMENTS

| 6,587,072 | B1 * | 7/2003 | Gresham et al. ................ 342/70 |
| 2005/0179585 | A1 * | 8/2005 | Walker et al. ................. 342/134 |

FOREIGN PATENT DOCUMENTS

IL    WO2006090394    8/2006

OTHER PUBLICATIONS

Levanon N :"Cross-correlation of long binary signals with longer mismatched filters|, IEE Proceedings" Radar, Sonar & Navigation, Institution of Electrical Engineers, GB, vol. 152, No. 6, Dec. 9, 2005, pp. 377-382.
Mozeson E et al :"Multicarrier Radar Signals With Low Peak-To-Mean Envelope Power Ratio", Radar, Sonar & Navigation, Institution of Electrical Engineers, GB, vol. 150, No. 2, Apr. 3, 2003, pp. 71-77.

* cited by examiner

*Primary Examiner* — Leon Flores
(74) *Attorney, Agent, or Firm* — Mark M. Friedman

(57) ABSTRACT

To generate a pulse for ranging, a kernel is convolved with a spreading sequence. The spreading sequence is parametrized by one or more ordered (length, sparsity) pairs, such that the first sparsity differs from the bit length of the kernel and/or a subsequent sparsity differs from the product of the immediately preceding length and the immediately preceding sparsity. Alternatively, a kernel is convolved with an ordered plurality of spreading sequences, all but the first of which may be non-binary. The pulse is launched towards a target. The reflection from the target is transformed to a received reflection, compressed by deconvolution of the spreading sequence, and post-processed to provide a range to the target and/or a direction of arrival from the target.

34 Claims, 14 Drawing Sheets

VARIABLE LENGTH RANGING AND DIRECTION-FINDING SIGNALS CONSTRUCTED FROM BANDLIMITED KERNELS AND SPARSE SPREADING SEQUENCES

FIELD AND BACKGROUND OF THE INVENTION

The present invention relates to signals such as radar signals that are used for range and direction finding and for imaging surfaces and objects and, more particularly, to a class of such signals whose length and bandwidth are parametrized independently. These signals may be used by range and direction finding devices, such as radars and their acoustic equivalents, that have single or multiple transmitters and receivers.

Pulsed signals such as radio-frequency (RF) signals and acoustic signals commonly are used for determining the distance and direction to a target. Reflections of the signals from the target are received, and the distance to the target is inferred as the product of the round-trip travel time and the speed of the signals in the medium in which the signals propagate to and from the target. The direction of arrival (DOA) is identified e.g. from differential arrival times at the receivers of a receiver array. Co-pending U.S. patent application Ser. No. 10/571,693, that is incorporated by reference for all purposes as if fully set forth herein, teaches a method of transmitting acoustic signals from the top of a silo and receiving echoes of the signals from the contents of the silo at the top of the silo to measure the shape of the top of the contents of the silo and so infer the volume of the contents of the silo. FIG. 1 shows one such silo 100, in cross-section. This application of pulsed signal range and direction finding is complicated by challenges including:

(i) The upper surface 104a or 104b of the silo contents 102 can be at a variable distance from the acoustic transmitters and receivers 106. This distance varies in a wide range: from tens of centimeters (104a) to tens of meters (104b). This creates the following sub-challenges:

i-1: a need for signal-to-noise-ratio (SNR) enhancement of weak arrived reflected pulses.

i-2: a need for pulses of different lengths

The need for SNR enhancement follows, in addition to the mentioned wide dynamic range of the acoustic paths, from the following issues:

(A) Specific silo contents surface geometry and/or specific geometry of silo walls and/or due to kinds of granularity of the silo contents. In particular, if due to specific environmental factors named above the geometrically reflected acoustic ray trajectories miss the receivers and only weak diffuse scattered rays approach the receivers, then the requirement of SNR amplification becomes even more urgent.

(B) The noises inside the silo.

(ii) In many cases, it is desirable that the transmission of the signal terminate before the process of acquisition of the signal starts at the receiver. Otherwise, the strong transmitted signal leaks into the acoustic receiver as a strong noise added to the possible weak received reflected signal of interest whose parameters are to be measured. This complicates the processing significantly. If transceivers serve both as transmitters and receivers for beamforming, as in U.S. Ser. No. 10/571,693, it also reduces the number of transceivers usable as receivers, since several transceivers will be still used for transmission; it also makes impossible the use of all transceivers for the simultaneous transmission to create a spatially sharp beam.

Thus, for these and other technological reasons the separation of the transmission and the reception in time is essential. This results in the demand that the length of the transmitted pulse [equal to the time period of its transmission multiplied by the speed of sound] be slightly shorter than the distance to the upper surface of the silo contents. This constraint is essential to the silo measurements, while it is absent e.g. from "standard" applications such as RF radar where targets such as airplanes, are far away from the rangefinder.

(iii) Typically, as shown in FIG. 2, the transmitted acoustic signal 110 in silo 100 returns back to receivers 106 not as a single pulse but as a sum [or "train"] of multiple reflections 112, 114. This multi-path phenomena is also known in musical acoustics as reverberation. It presents challenges to discrimination of different reflections [in particular, for point mapping upon the upper surface of the silo contents]. In particular, it would be desirable to have a short-in-time signal, without long tails or ripples, since the tail or ripple of one reflected signal may mix with another reflected signal and cover or "camouflage" the other reflected signal, thus making discrimination of the two reflected signals problematic or impossible. Thus: good separation of the received pulses in-time [after their pre-processing] is required, for time of arrival (TOA) determination and DOA determination and the output pulses [again, after pre-processing] need to be to be as short as possible in time to achieve good resolution and to have tails with very small peak-to-ripple ratios. This challenge is addressed below by an innovative design of the transmitted pulse, and innovative pulse processing.

The term "pre-processing" means the intermediate processing step. In typical prior art general radar or communication systems this includes application of e.g. Matched Filtering (MF) [correlation of the signal pulse with itself, which is an example of pulse compression] or application of other type of filtering which reduces the side-lobes, e.g. mis-matched filtering.

(iv) In addition, the transmitted acoustic pulse has to be band-limited. This follows from several reasons. The first reason is related to the transfer functions of the acoustic antenna (for example, a horn antenna) and of the [electro-mechanical] driver of the acoustic transducer, since the transmission in the frequency domain of high attenuation of the total transfer function is a waste of energy and causes warping of the signal shape. The second reason involves the acoustic noise in silos. Typically the noise is expected to be high at the low frequencies [usually less than 1 kHz] and thus the signal spectrum needs to be separated from these areas.

Note, that the Doppler effect of the signal frequency shift is not an issue for an acoustic rangefinder in a typical silo due to the slow movement of the material surface and the kilo-Hertz range of the carrier frequency. For example, for 1 cm/sec movement and a 5 kHz carrier, and assuming a speed of sound of 340 m/sec, the frequency shift is about 0.01/340*5000=0.14 Hz, which is negligible.

The following notation is used below:

(A) The Z-Transform and Sparsity

The standard notation for the z-transform of a sequence is used herein. For example, the z-transform of the Barker 5 sequence, [1 1 1 −1 1], is $$b_5(z) = 1 + z^{-1} + z^{-2} - z^{-3} + z^{-4}$$

The notation $b_5(z^{30})$ means:

$$b_5(z^{30}) = 1 + z^{-30} + z^{-60} - z^{-90} + z^{-120}$$

This is the z-transform of a sparse sequence of length 121 with only five non-zero values equidistant from one another.

The value 30 is the "sparsity" of the new sequence that has been created from the original sequence [1 1 1 −1 1]. The original Barker 5 sequence has a sparsity of 1. Such original sequences of unit sparsity also are referred to herein as "templates" from which sparse sequences are derived. In this example, $b_5(z)$ is the template of $b_5(z^{30})$.

(B) Convolution

Several notations are used herein for convolution. All these notations are standard in the signal processing literature.

"⊗" means convolution. For example, if s1=[1, 2] and s2=[1, 2, 3] then c=s1⊗[1, 4, 7, 6]. An alternative notation is are c=conv(s1, s2). In the z-transform domain, the z-transform of c is the product of the z-transforms of s1 and s2.

(C) Matched Filter

MF( . . . ) means a matched filtering operation on a sequence. For example, for a sequence [a b c d e], MF([a b c d e])=[e* d* c* b* a*]; where "*" means conjugation for complex-valued components. For real-valued sequences, MF( . . . ) is equivalent to time-reversal (or index-reversal) of the sequence.

The following references provide background for the prior art of ranging pulse construction and processing:

[BARKER 1953] Barker, R. H: "Group synchronizing of binary digital system" in Jackson, W, (Ed): *Communication theory* (Butterworths, London, 1953), pp. 273-287.

[BORWEIN 2008] Borwein P., and Mossinghoff M. J., Barker sequences and flat polynomials (with P. Borwein), *Number Theory and Polynomials* (Bristol, U.K., 2006), J. McKee and C. Smyth, eds., London Math. Soc. Lecture Note Ser. 352, Cambridge Univ. Press, 2008.

[CHEN 2002] Chen, R., and Cantrell B: "Highly bandlimited radar signals", *Proceedings of the 2002 IEEE Radar Conference*, Long Beach, Calif., Apr. 22-25, 2002, pp. 220-226.

[LEVANON 2004] Levanon N., and Mozeson E: Radar Signals, Wiley & Sons, New York, 2004, xiv+411 pp.

[LEVANON 2005] Levanon N: "Cross-correlation of long binary signals with longer mismatched filters", *IEE Proc.—Radar, Sonar and Navigation*, 152 (6), 372-382, 2005.

[NATHANSON 1999] Nathanson F. E., Reilly J. P., cohere M. N.: "Radar Design Principles Signal Processing and the Environment", $2^{nd}$ edition, *SciTech Publishing*, 1999, 720 pp.

Conventional Construction of a Phase-Coded Ranging Pulse

In the baseband ("BB") representation, a phase coded ranging pulse is represented as a weighted sum of time-continuous baseband shapes [or functions] $\Psi(t/t_b)$ which are equally distanced from each other by "bit" time $t_b$ [LEVANON 2004, Section 6]:

$$u_{BB}(t) = \sum_{m=1}^{M} s_m \cdot \Psi_{BB}\left(\frac{t}{t_b} - (m-1)\right) \qquad \text{(eq. 1A)}$$

This signal is a continuous function of time t. The digital realization of the signal is sampled with a periodicity of $T_s \leq t_b$. The "signal bit length" $L_b$ is the number of samples per bit time, $L_b = t_b/T_s$, rounded to the nearest integer.

The weight [or spreading] sequence, $s=\{s_m\}$, m=1:M, is typically a sequence with good correlation properties. In general, the shape function and the digital sequence may be real or complex valued. The sequence s does not have to be binary;

the term "bit" time is thus used for historical reasons, since the first (and still widely used) spreading sequences are the Barker binary codes.

The baseband pulse $u_{BB}(t)$ needs to be up-converted at the transmitter to the carrier frequency $f_c$ by using standard techniques. It then needs to be down-converted at the receiver.

For the specific but very common case of a real-valued spreading sequence s and for real-valued shapes, one may write the transmitted pulse u(t), modulated by a carrier frequency $f_c$ in a way similar to (eq. 1A):

$$u(t) = \sum_{m=1}^{M} s_m \cdot \Psi\left(\frac{t}{t_b} - (m-1)\right) \qquad \text{(eq. 1B)}$$

where the "passband shape" $\Psi$ is $\Psi_{BB}$ multiplied by a sinusoid of frequency $f_c$:

$$\Psi\left(\frac{t}{t_b}\right) = \Psi_{BB}\left(\frac{t}{t_b}\right) \cdot \sin(2\pi f_c t + \phi_0) \qquad \text{(eq. 1C)}$$

and $\phi_0$ is an arbitrary phase. The phase can be chosen, for example, in such a way that $\Psi(t/t_0)=0$ at the earliest time t for which $\Psi(t/t_0)$ is defined [for example if $\Psi(t/t_0)$ starts at t=0, one may choose $\phi_0=0$].

As described above, the digitally sampled baseband pulse $u_{BB}(t)$ is up-converted to the carrier frequency $f_c$. Alternatively, the passband pulse u(t) is sampled digitally and converted directly to the transmitted analog signal by direct digital-to-analog conversion.

The "kernel" (defined below) illustrated in FIG. 5 below is an example of a sampled passband shape created by multiplying a Kaiser window baseband shape by a sinusoid.

Shape Functions and Bandwidth Considerations for Ranging Pulses

The simplest example of a shape function is the rectangular function, which has support, i.e., is non-zero, only in the interval $t=[0,t_b]$ [LEVANON 2004, Section 6, p. 100]:

$$\Psi_{BB}\left(\frac{t}{t_b}\right) = rect\left(\frac{t}{t_b}\right) = \begin{cases} 1 & \text{for } 0 \leq t \leq t_b \\ 0 & \text{for } t < 0 \text{ or } t > t_b \end{cases} \qquad \text{(eq. 2A)}$$

This leads to:

$$u_{BB}(t) = \sum_{m=1}^{M} s_m \cdot rect\left(\frac{t}{t_b} - (m-1)\right)$$

The rectangle shape attenuates frequency very poorly. The power spectrum of the pulse behave as a sine function [see NATHANSON 1999, pp. 544, 555]:

$$G(f) = \frac{\sin^2(\pi f t_b)}{(\pi f t_b)^2}$$

Therefore, smoother functions need to be introduced to satisfy the bandwidth constraints.

One solution that applies to this problem is described in [LEVANON 2004, section 6.8, pp. 145-155], which cites the original article [CHEN 2002] and presents the shape as a Gaussian-windowed sine function: [LEVANON 2004, p. 151, equation 6.25]:

$$\Psi_{BB}\left(\frac{t}{t_b}\right) = \begin{cases} \dfrac{\sin\left(\pi\frac{t}{t_b}\right)\cdot\exp\left\{-\dfrac{1}{2\sigma^2}\left(\dfrac{t}{t_b}\right)^2\right\}}{\pi\left(\dfrac{t}{t_b}\right)} & \text{for } -2t_b \leq t \leq 2t_b \\ 0 & \text{for } t < -2t_b \text{ or } t > 2t_b \end{cases} \quad \text{(eq. 2B)}$$

In the above references, the parameter σ is suggested to be chosen as σ=0.7. The parameter $t_b$ is chosen to satisfy the bandwidth constraints [the spectrum vs. non-dimensional coordinate f–$t_b$ is shown in FIG. 6.42 on p. 153 and 6.45 on p. 154. of [LEVANON 2004]].

The above shapes all have time-support, i.e. they are non-zero, upon a [small, typically 1 or 2 or 4] integral number of $t_b$ intervals. This means that for the sampled signals, the signal bit length is equal to the length of the sampled shape function sequence for the rectangular shape function of equation (2A) and to one-quarter of the length of the sampled gaussian-windowed sine shape function of equation 2B.

Some Known Sequences with Good Correlation Properties

A typical ranging pulse is based upon a sequence with good correlation properties [see LEVANON 2004, Chapter 6, Sections 6.1, 6.2, 6.3, 6.4, 6.5, 6.7]. For example, the most celebrated ones are the Barker sequences introduced in 1953 by Barker [BARKER 1953]:

b3=[1,1,–1]
b4A=[1,1,–1,1]
b4B=[1,1,1,–1]
b5=[1,1,1,–1,1]
b7=[1,1,1,–1,–1,1,–1]
b11=[1,1,1,–1,–1,–1,1,–1,–1,1,–1]
b13=[1,1,1,1,1,–1,–1,1,1,–1,1,–1,1]

Each of these sequences has a relatively flat spectrum and also the exceptional property that the peak-to-maximal-ripple-ratio of its auto-correlation is equal to the length of the sequence. This ratio, when calculated in dB, is known in the radar literature as PSL [Peak Sidelobe Level]. For example for b5, this ratio is 5 to 1 [or PSL=$10\log_{10}(1/5^2) \approx -14$ dB]. The PSLs of the Barker codes are shown in [NATHANSON 1999, Table 12.1, p. 538].

All known Barker codes are listed above. To enlarge the pulse energy the longer pulses, that have more sequence elements, are used. Still, it is assumed that the autocorrelation properties of such sequences are good. One may find discussion of such codes and some examples e.g. in [LEVANON 2004, Chapter 6, Table 6.3 pp. 108-109], where the sidelobe level is shown, while the peak level corresponds to the length of the sequence; see also [NATHANSON 1999, pp. 537-541, especially the Table 12.2 on pp. 540], where also the number of different possible sequences having the same sidelobe level is presented].

Modern mathematical review of generalizations of Barker sequences may be found in [BORWEIN 2008]. In the mathematical literature, the Littlewood polynomials [polynomials with coefficients ±~1] are discussed. As an example, the following two sequences, representing the Littlewood polynomials with good autocorrelation properties, are listed in [BORWEIN 2008] and are given as:

seq20=[1,1,1,1,1,–1,1,–1,–1,–1,1,–1,1,1,–1,–1,1,1,–1]
seq25=[1,1,1, –1, –1, –1,1,1,1,1,1,1, –1,1, –1,1, –1, –1,1, –1,1,1, –1]

Nested Sequences

A well-known way to construct longer sequences is to use nested codes [see LEVANON 2004, section 6.1.2, pp. 107-109, and LEVANON 2005]. This method is also known as code concatenation (or combination); if two Barker codes are used, the code is also named Barker-squared, see [NATHANSON 1999, pp. 541-542]. For example, instead of 1's and –1's in the binary code, such as a Barker code or a Littlewood polynomial, one may insert another code. To illustrate this approach let us use Barker b5 as a template, and an arbitrary Barker sequence "b" of length "L"; then one may write a sequence of length L·5:

nested_sequence_$Lx5$=[b,b,b,–b,b]

Typically, a Barker code is nested inside of another Barker code. As an example, one may use Barker 5 as the "b" sequence, b=b5, and obtain the 5×5 nested Barker code of length 25:

nested_sequence_$5x5$=[b5,b5,b5,–b5,b5]

The nested code obtained by nesting Barker b13 into itself, 13×13 is mentioned in the literature; see for example [LEVANON 2005]. An example of a very long code using four combined Barker codes: 5×13×13×13 (with total length 10,985) is mentioned in [NATHANSON 1999, p. 542].

Note that nesting does not improve the peak-to-maximum-ripple ratios in the autocorrelation of the nested code [LEVANON 2004]. For example the auto-correlation of b5 nested into b13 (or vice versa) consists of values {0, 1, 5, 13, 65}, hence the peak to max ripple ratio is equal to 5[65/13=5].

Thus the nested code enlarges the pulse energy but does not improve the correlation properties [the PSL value].

Pulse Processing

Pulse compression is achieved by convolution of the received signal with the matched filter of the transmitted signal. This shrinks the long M-element based signal to one energetic main-lobe [which represents the auto-correlation of the shape-function and accumulates the energy of the long pulse] surrounded by side-lobes. For example, if the rectangular shape is used (see eq. 2A) together with the sequence Barker 13, b13, than the well known saw-shape appears as the result of this convolution: it contains one triangular main-lobe and six identical triangular side-lobes to the left and right of the main-lobe. The relation of the peak amplitude of the main-lobe to the peak of each side-lobe is 13/1 as it has to be when the Barker code of length 13 is used [see NATHANSON 1999, FIG. 12.2 on p 536. This example of pulse compression is shown in FIG. 3].

Note also that the main-lobe typically becomes wider than the original shape, as a side-effect of the matched filtering. For example, in the above example the triangle of the main-lobe occupies the time interval [–$t_b$,$t_b$], whereas the original rectangular shape-function occupies the time interval [0,$t_b$].

To suppress the side-lobes, mis-matched filtering is introduced [see LEVANON 2004, Section 6.6 pp. 140-142]. For this purpose an especially pre-calculated sequence, "q" of length K is used. This digital sequence is prepared such that the convolution of the original spreading sequence s with the mismatched sequence q, $$g = s \otimes q$$

is close to a "delta function", i.e., it has one large value ("the peak") and all other values are small. For example, [LEVANON 2005] demonstrates that a filter that is three times longer than the original Barker 13 [i.e. a mis-matched filter of length 3*13=39] leads to a PSL ratio better than –40 dB (specifically, –43.241 dB). [NATHANSON 1999, Section 12.4 pp. 555-559] mentions that the PSL level can be reduced as low as one desires. For example, a plot for the PSL level vs. mis-matched filter length is shown in [NATHANSON 1999, FIG. 12.10, p. 557] and demonstrates PSL about −55 dB for Barker 13 and a mis-matched filter of length about 63.

Using a mis-matched filter leads to some SNR loss, which is relatively small for Barker 13 [tenths of a dB, for example just 0.2 dB according to [LEVANON 2005]]. The SNR loss may be larger for other spreading sequences [NATHANSON 1999, p. 557].

The application of very long mis-matched filters to nested binary codes is discussed in [LEVANON 2005]. For example, a mismatched filter of length 507 is applied to a 13×13 Barker nested code. The length is chosen to be three times the total length of the nested code: 507=3×3×13. The PSL attained is about −40 dB.

For the case of rectangular shape functions and nested binary codes, a special mechanism based on several digital signal processors for mismatched filtering is discussed in [NATHANSON 1999, pp. 571-573].

SUMMARY OF THE INVENTION

According to the present invention there is provided a transmitter including: (a) a pulse shaper for generating an input pulse that is a convolution of a kernel parametrized by a bit length and a spreading sequence parametrized by at least one parameter pair that consists of a spreading length and a sparsity, wherein the bit length and the at least one parameter pair form an ordered set that satisfies at least one condition selected from the set consisting of: (i) a first sparsity is different from the bit length and (ii) if the ordered set includes a plurality of the spreading lengths and the sparsities, then at least one sparsity subsequent to the first sparsity is different from a product of an immediately preceding spreading length and an immediately preceding sparsity; (b) a mechanism for transforming the input pulse to a transmitted pulse; and (c) a transducer for launching the transmitted pulse as a signal propagating in a medium.

According to the present invention there is provided a non-contact sensing device, including: (a) a transmitter that includes a pulse shaper for generating an input pulse to be transformed to a transmitted pulse that is launched as a signal that propagates in a medium towards a target, the input pulse being a convolution of a kernel parametrized by a bit length and a spreading sequence parametrized by at least one parameter pair that consists of a spreading length and a sparsity, wherein the bit length and the at least one parameter pair form an ordered set that satisfies at least one condition selected from the set consisting of: (i) a first sparsity is different from the bit length and (ii) if the ordered set includes a plurality of the spreading lengths and the sparsities, then at least one sparsity subsequent to the first sparsity is different from a product of an immediately preceding spreading length and an immediately preceding sparsity; and (b) a receiver that includes: (i) at least one transducer for coupling to the medium to receive a respective reflection of the signal from the target, (ii) for each transducer: (A) a mechanism for transforming the respective received reflection to a respective received representation of the input pulse, and (B) a pulse compressor for deconvolving the spreading sequence from the respective received representation of the input pulse, thereby providing a respective compressed pulse, and (iii) a post-processor for post-processing the at least one compressed pulse.

According to the present invention there is provided a method of transmitting a signal into a medium, including the steps of: (a) generating an input pulse that is a convolution of a kernel parametrized by a bit length and a spreading sequence parametrized by at least one parameter pair that consists of a spreading length and a sparsity, wherein the bit length and the at least one parameter pair form an ordered set that satisfies at least one condition selected from the set consisting of: (i) a first sparsity is different from the bit length and (ii) if the ordered set includes a plurality of the spreading lengths and the sparsities, then at least one sparsity subsequent to the first sparsity is different from a product of an immediately preceding spreading length and an immediately preceding sparsity; (b) transforming the input pulse to a transmitted pulse; and (c) launching the transmitted pulse into the medium as the signal.

According to the present invention there is provided a method of non-contact sensing of a target, including the steps of: (a) generating an input pulse that is a convolution of a kernel parametrized by a bit length and a spreading sequence parametrized by at least one parameter pair that consists of a spreading length and a sparsity, wherein the bit length and the at least one parameter pair form an ordered set that satisfies at least one condition selected from the set consisting of: (i) a first sparsity is different from the bit length and (ii) if the ordered set includes a plurality of the spreading lengths and the sparsities, then at least one sparsity subsequent to the first sparsity is different from a product of an immediately preceding spreading length and an immediately preceding sparsity; (b) transforming the input pulse to a transmitted pulse; (c) launching the transmitted as a signal propagating in a medium towards the target; (d) receiving at least one reflection of the signal from the target; (e) for each received reflection: (i) transforming the each received reflection to provide a respective received representation of the input pulse, and (ii) compressing the respective received representation of the input pulse by deconvolving the spreading sequence from the respective received representation of the input pulse, thereby providing a respective compressed pulse; and (f) post-processing the at least one compressed pulse.

According to the present invention there is provided a transmitter including: (a) a pulse shaper for generating an input pulse that is a convolution of a kernel and an ordered plurality of spreading sequences, wherein at least one spreading sequence subsequent to a first spreading sequence is not a binary sequence; (b) a mechanism for transforming the input pulse to a transmitted pulse; and (c) a transducer for launching the transmitted pulse as a signal propagating in a medium.

According to the present invention there is provided a non-contact sensing device, including: (a) a transmitter that includes a pulse shaper for generating an input pulse to be transformed to a transmitted pulse that is launched as a signal that propagates in a medium towards a target, the input pulse being a convolution of a kernel and an ordered plurality of spreading sequences, wherein at least one spreading sequence subsequent to a first spreading sequence is not a binary sequence; and (b) a receiver that includes: (i) at least one transducer for coupling to the medium to receive a respective reflection of the signal from the target, (ii) for each transducer: (A) a mechanism for transforming the respective received reflection to a respective received representation of the input pulse, and (B) a pulse compressor for deconvolving the spreading sequence from the respective received representation of the input pulse, thereby providing a respective compressed pulse, and (iii) a post-processor for post-processing the at least one compressed pulse.

According to the present invention there is provided a method of transmitting a signal into a medium, including the steps of: (a) generating an input pulse that is a convolution of a kernel and an ordered plurality of spreading sequences, wherein at least one spreading sequence subsequent to a first spreading sequence is not a binary sequence; (b) transforming the input pulse to a transmitted pulse; and (c) launching the transmitted pulse into the medium as the signal.

According to the present invention there is provided a method of non-contact sensing of a target, including the steps of: (a) generating an input pulse that is a convolution of a kernel and an ordered plurality of spreading sequences, wherein at least one spreading sequence subsequent to a first spreading sequence is not a binary sequence; (b) transforming the input pulse to a transmitted pulse; (c) launching the transmitted pulse as a signal propagating in a medium towards the target; (d) receiving at least one reflection of the signal from the target; (e) for each received reflection: (i) transforming the each received reflection to a respective received representation of the input pulse, and (ii) compressing the respective received representation of the input pulse by deconvolving the spreading sequence from the respective received representation of the input pulse, thereby providing a respective compressed pulse; and (g) post-processing the at least one compressed pulse.

According to the present invention there is provided a method of transmitting a signal into a medium, including the steps of: (a) selecting a desired length of an input pulse; (b) selecting a kernel and a spreading sequence, such that when the kernel is convolved with the spreading sequence without nesting the kernel in the spreading sequence, an output of the convolution is the input pulse having the desired length; (c) generating the input pulse; (d) transforming the input pulse into a transmitted pulse; and (e) launching the transmitted pulse into the medium as the signal.

According to the present invention there is provided a method of transmitting a signal into a medium, comprising the steps of: (a) generating an input pulse by convolving a kernel with a spreading sequence that is selected so that a length by which the input pulse exceeds a length of the kernel is not determined by the length of the kernel; (b) transforming the input pulse into a transmitted pulse; and (c) launching the transmitted pulse into the medium as the signal.

A first basic transmitter of the present invention includes a pulse shaper, a transformation mechanism and a transducer.

The pulse shaper generates an input pulse (either a baseband pulse or a passband pulse) by convolving a kernel with a spreading sequence. The kernel is parametrized by a bit length. The spreading sequence is parametrized by one or more pairs (preferably two or more pairs) of a spreading length and a sparsity. The bit length and the spreading sequence parameter pair(s) are an ordered set: bit length, first spreading length, first sparsity, second spreading length (if present), second sparsity (if present), etc. As described below, there are some prior art input pulses that can be generated in this manner. These prior art input pulses are excluded from the scope of the appended claims by requiring that the first sparsity be different from the bit length and/or (if there are two or more spreading sequence parameter pairs) that the second or subsequent sparsity be different from the product of the immediately preceding spreading length and the immediately preceding sparsity.

The transformation mechanism transforms the input pulse to a transmitted pulse. If the input pulse is a passband pulse then the transformation mechanism includes a digital-to-analog converter. If the input pulse is a baseband pulse then the transformation mechanism includes a modulator for modulating a carrier wave with the baseband pulse.

The transducer launches the transmitted pulse as a signal propagating in a medium that supports such propagation.

Preferably, the spreading sequence is a convolution of a plurality of spreading functions, with each spreading function being parametrized by a respective spreading sequence parameter pair. For example, if the spreading sequence is the inverse z-transform of the spreading filter product $b_5(z^{25})b_{13}(z^{129})$ discussed below, the first spreading function, the inverse z-transform of $b_5(z^{25})$, is parametrized by a spreading length of 5 and a sparsity of 25, and the second spreading function, the inverse z-transform of $b_{13}(z^{129})$, is parametrized by a spreading length of 13 and a sparsity of 129. Note that this spreading filter product, and hence the associated spreading sequence, satisfies the condition that the second sparsity be different from the product of the first spreading length and the first sparsity: $5 \times 25 = 125 \neq 129$.

Most preferably, the pulse shaper generates the input pulse by a plurality of convolutions equal in number to the plurality of spreading functions. The first convolution is of the kernel with the first spreading function. Each subsequent convolution is of the output of the immediately preceding convolution with the next spreading function. For example, if the spreading sequence is the inverse z-transform of the spreading filter product $b_5(z^{25})b_{13}(z^{129})$ the first convolution is of the kernel with the inverse-z-transform of $b_5(z^{25})$ and the second convolution is of the output of the first convolution with the inverse z-transform of $b_{13}(z^{129})$.

In some embodiments, the signal is an electronic signal. In other embodiments, the signal is an acoustic signal.

A first basic non-contact sensing device of the present invention includes a transmitter and a receiver. The transmitter includes at least the pulse shaper as described above for generating an input pulse to be transformed to a transmitted pulse that is launched as a signal towards a target via a medium in which the signal propagates. The receiver includes one or more transducers with associated respective transformation mechanisms and pulse compressors and a post-processor. The transducer(s) is/are for coupling to the medium to receive (a) (respective) reflection(s) of the signal from the target. Each demodulator demodulates its received reflection to provide a received representation of the input pulse. Each pulse compressor deconvolves the spreading sequence from its representation of the input pulse to provide a compressed pulse. The post-processor post-processes the compressed pulse(s). Depending on how the device is configured, the post processing could include obtaining (a) travel time(s) from the transmitter to the transducer(s) via the target and inferring a range to the target from the travel time(s); and additionally or alternatively obtaining a direction of arrival of the received reflection(s).

If, as is preferred, the spreading sequence is a convolution of a plurality of spreading functions, with each spreading function being parametrized by a respective parameter pair, then each pulse compressor deconvolves the spreading sequence from its representation of the input pulse by a plurality of deconvolutions equal in number to the plurality of spreading functions. The first deconvolution is of the last spreading function from the representation of the input pulse. Each subsequent deconvolution is of the preceding spreading function from the output of the immediately preceding deconvolution. Most preferably, each deconvolution is effected using a respective key whose sparsity is equal to the sparsity of the spreading sequence being deconvolved. Such sparse deconvolutions are highly efficient.

In some embodiments, the signal is an electronic signal. In other embodiments, the signal is an acoustic signal.

In some embodiments, the pulse compressor(s) use(s) (a) matched filter(s) to deconvolve the spreading sequence from the representation(s) of the input pulse. In other embodiments, the pulse compressor(s) use(s) (a) mismatched filter(s) to deconvolve the spreading sequence from the representation(s) of the input pulse.

A first method of transmitting a signal into a medium includes generating an input pulse as described above in the context of the first basic transmitter of the present invention, transforming the input pulse to a transmitted pulse, and launching the transmitted pulse into the medium as the signal.

A first method of non-contact sensing of a target performs the first method of transmitting a signal to launch the signal towards the target. Then the method receives one or more reflections of the signal from the target. The received reflection(s) is/are transformed to (a) (corresponding) received representation(s) of the input pulse. The representation(s) of the input pulse is/are compressed, by deconvolving the spreading sequence from the representation(s) of the input pulse, to provide (a) compressed pulse(s). The compressed pulse(s) are post-processed to obtain a range to the target and/or a direction of arrival of the reflection(s) from the target.

A second basic transmitter of the present invention also includes a pulse shaper, a transformation mechanism and a transducer.

The pulse shaper generates an input pulse by convolving a kernel with an ordered plurality of spreading sequences. As described below, there are some prior art input pulses that can be generated in this manner. These prior art input pulses are excluded from the scope of the appended claims by requiring that at least one of the spreading sequences subsequent to the first spreading sequence be non-binary. In the prior art, such convolution of spreading sequences is successive nesting of the first spreading sequence in the second spreading sequence, of the nested first and second spreading sequences in the third spreading sequence, etc., and such nesting of a source sequence in a target sequence is defined only for a binary target sequence. A "binary" sequence is a sequence, all of whose members take on one of only two values. Usually these values are "−1" and "1".

The transformation mechanism transforms the input pulse to a transmitted pulse. If the input pulse is a passband pulse then the transformation mechanism includes a digital-to-analog converter. If the input pulse is a baseband pulse then the transformation mechanism includes a modulator for modulating a carrier wave with the baseband pulse.

The transducer launches the transmitted pulse as a signal propagating in a medium that supports such propagation.

A second basic non-contact sensing device of the present invention includes the pulse shaper of the second basic transmitter of the present invention, and otherwise is identical to the first basic non-contact sensing device of the present invention.

A second method of transmitting a signal into a medium includes generating an input pulse as described above in the context of the second basic transmitter of the present invention, transforming the input pulse to a transmitted pulse, and launching the transmitted pulse into the medium as the signal.

A second method of non-contact sensing of a target performs the second method of transmitting a signal to launch the signal towards the target, and subsequently is identical to the first method of non-contact sensing of the target.

As described below, the non-contact sensing devices of the present invention could be, for example, radar remote sensing devices, acoustic remote sensing devices, medical ultrasound devices or seismic exploration devices. Such medical ultrasound devices are "non-contact" sensing devices in the sense that the transducers of the devices are coupled to the skin of a patient whereas the targets of the sensing are organs and tissues that are not in contact with the skin of the patient.

Normally, a non-contact sensing device of the present invention that measures DOA includes a plurality of transmitters and/or receivers so that DOA can be determined by standard methods such as beamforming.

The first method of transmitting a signal into a medium is a special case of a more general method, in which a desired length of an input pulse is selected and then a kernel and a spreading sequence are selected, such that when the kernel is convolved with the spreading sequence without nesting the kernel in the spreading sequence, the output of the convolution is the input pulse that has the desired length. In the context of the first method of transmitting a signal into a medium, changing the sparsities of the spreading sequences changes the length of the input pulse. The input pulse is generated and transformed into a transmitted pulse that is launched into the medium as the signal. Preferably, the spreading sequence is parametrized by one or more sparsities.

From another point of view, this method generates an input pulse of a desired length by convolving a kernel with a spreading sequence that is selected so that the length by which the input pulse exceeds the length of the kernel is not determined by the length of the kernel, as it would be if the convolution merely nested the kernel in the spreading sequence.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

The principles and operation of ranging and direction-finding signals according to the present invention may be better understood with reference to the drawings and the accompanying description.

Figure 1:
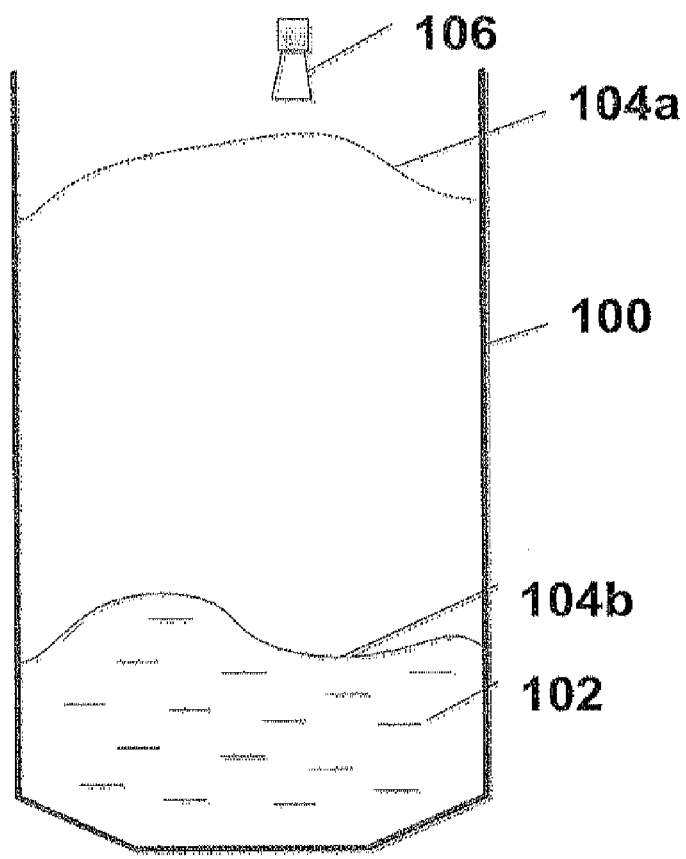
FIGS. 1 and 2 illustrate the transmission of acoustic signals inside a silo.
Figure 2:
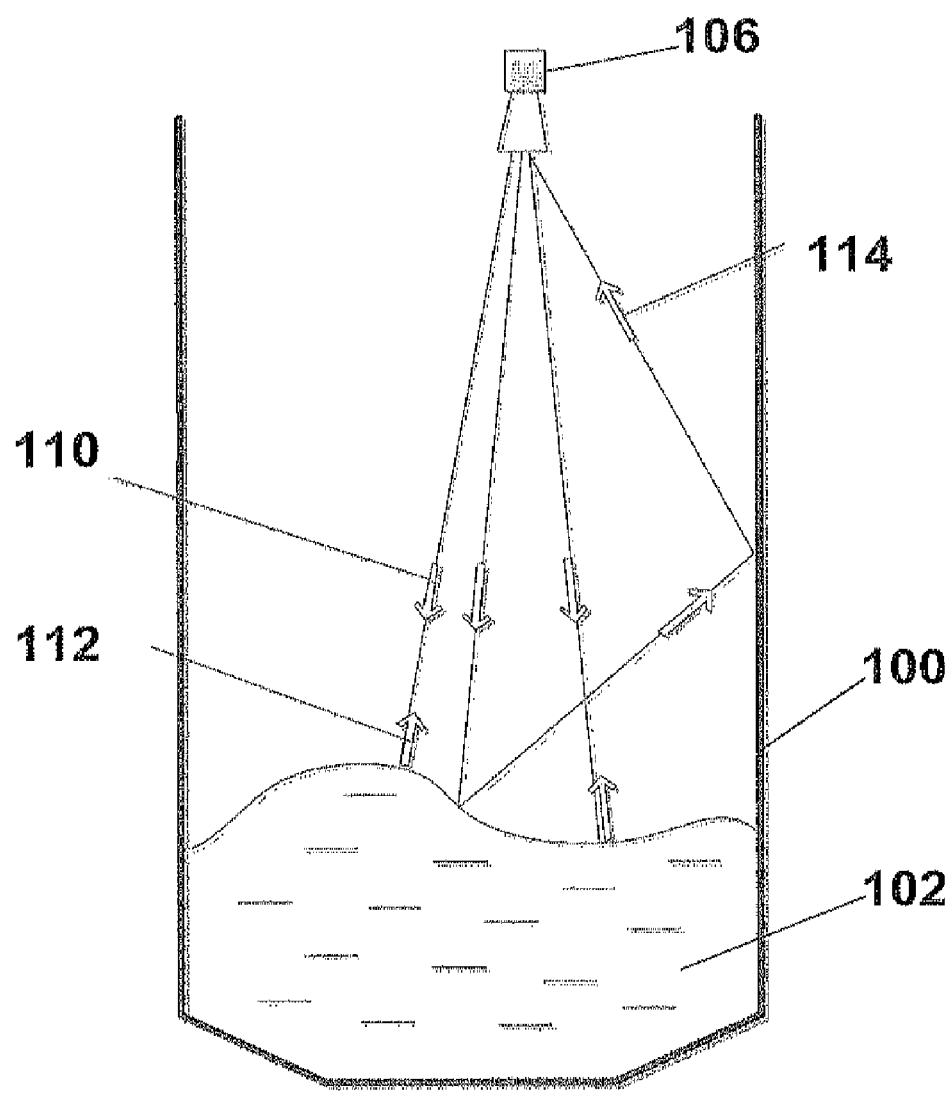
Figure 3:
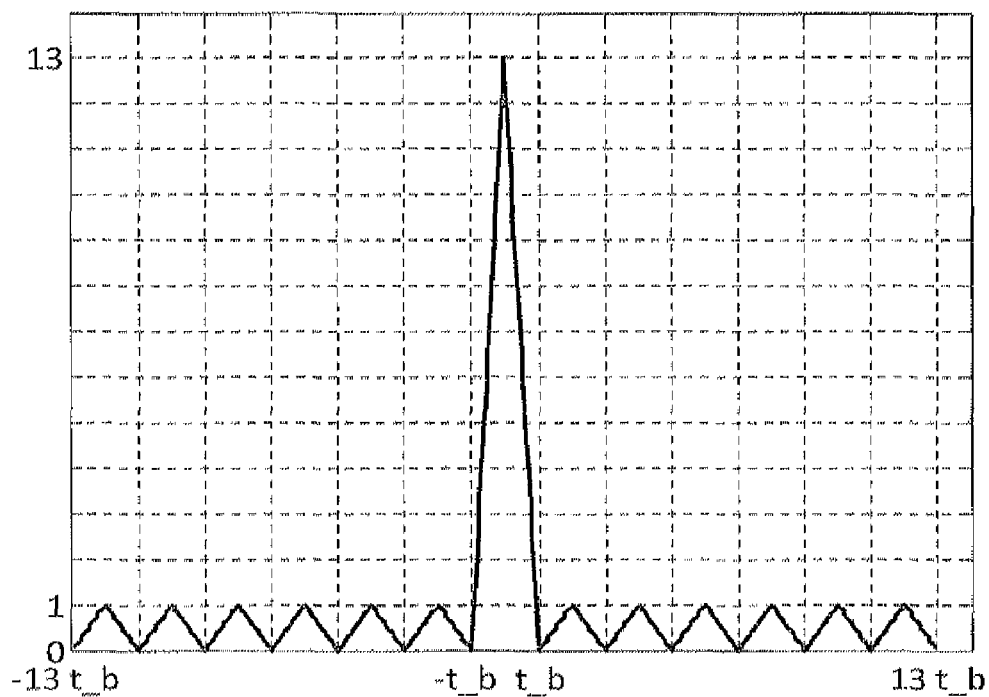
FIG. 3 shows the results of pulse compression of the Barker 13 code by matched filtering.
Figure 4:
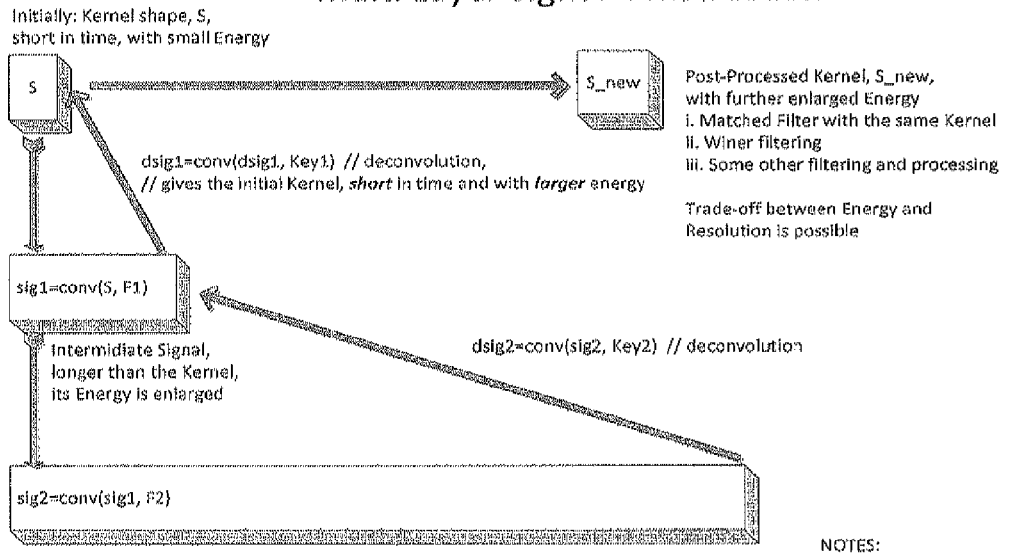
FIG. 4 is an overview of multi-layer signal construction and processing.

Referring again to the drawings, the principle of multi-layer signal construction and processing is shown in FIG. 4.

The present invention uses multi-layer signal construction with an arbitrary number N of layers, including the specific cases of N=1 [only one layer], N=2 [two layers], N=3 etc. A particular important case of just two layers is what is shown in FIG. 4.

The following discussion focuses on digital version of the signal. This is possible due to the frequency range of acoustic range and direction finders such as are used in U.S. Ser. No. 10/571,693. The acoustic signals typically occupy the frequency range of several kilohertz; hence digital oversampling can be easily applied. Such oversampling may be performed at frequencies of tens of kilohertz.

General Discussion

The ranging and direction finding pulse construction and processing of the present invention first is described in general terms/language. The precise mathematical description and comparison to the prior art techniques follows below.

Transmitter Processing $0^{th}$ layer. use a short-in-time kernel (the term "kernel" is defined below in the Mathematical Description section) that satisfies the bandwidth restrictions.

$1^{st}$ layer. convolve the kernel with a spreading sequence that is either itself a convolution of several spreading functions or just one short or long spreading function to increase the SNR. The case of several spreading functions is a "multi-layered" design.

Every spreading function has its own spreading factor, which can be small or large. Spreading factors govern the efficiency of the design as well as the total signal length in time.

First Receiver Processing: Deconvolution

Remove all the spreading functions by using de-convolution filters: this increases the SNR. These filters also are called keys herein, since they open the spreading functions. To not increase the noise, the keys are scaled to have unit norm for their total convolution. The spreading factor of a key is exactly the same as of its corresponding spreading function. This processing results in obtaining back the original kernel (thus short in-time) having enlarged SNR and flanked by some small ripples. The ripples may be diminished to any value by using longer keys, if desired.

Second Receiver Processing: Kernel Post-Processing

The recovered kernel can be further post-processed. For example, one of the possible ways includes standard. Matched Filtering (having the best SNR, but not the best resolution), filtering using a Wiener filter, or application of a filter that filters out the noise frequency in the silo, or any other possible means. The post-processing can be done also in many ways which are well-known in the art and so need not be elaborated here. This post-processing is usually aimed at estimation of TOA [Time of Arrival] and/or DOA [Direction of Arrival] of the pulse. Methods for DOA or TOA estimation are well-known in the art and so are not elaborated here. For example, U.S. Ser. No. 10/571,693 uses beamforming.

Mathematical Description and Comparison with Prior Art

Construction of the Transmitted Signal

The signal is constructed by convolving a kernel whose z-transform is a kernel shape S(z) and several cascaded spreading functions (N functions) whose z-transforms are spreading filters $F_k(z^{D_k})$, each of which has its own sparsity $D_k$. In the z-transform domain, this convolution is multiplication:

$$sig(z)=S(z) \cdot F_1(z^{D_1}) \cdot F_2(z^{D_2}) \cdot \ldots \cdot F_N(z^{D_N}) \quad \text{(eq. 3.1)}$$

The signal, if desired, can be back-scaled to unit amplitude before the final D/A [Digital to Analog] conversion and amplification.

Scaling [e.g. to unit amplitude] may be performed at the final stage [leading to the smallest quantization error], as follows:

$$\text{scaled\_sig}[n] = \frac{sig[n]}{\max(|sig|)} \quad \text{(eq. 3.2)}$$

(in the time domain) for every time sample "n", or at any cascade stage, depending upon the specific realization.

The kernel has to be as short in time as possible to deliver good resolution in time. The kernel length is only limited by the bandwidth constraint requirements of the (acoustic) hardware [since short-in-time signals are wide in frequency]. The shortness in time of the kernel also significantly improves the ability to recognize (and also not to miss) the target point reflection by reducing the interference between reflected signals.

The spreading filters $F_k(z^{D_k})$ can be based upon any digital sequence. Such a sequence may be any real-valued or complex-valued sequence. As a particular case, such a sequence can be binary and in particular may be based on Barker sequences or on other sequences with coefficients ±1 (e.g. the Littlewood polynomials).

The spreading filters and the sparsities $D_k$ govern the total length of the signal and the pulse energy.

The convolution of the kernel with the spreading sequence can be performed in many ways. For example:

(i) directly: The kernel is convolved with the entire multilayer spreading sequence, which typically is long (its length is equal to the total pulse length minus the kernel length plus one) and has an irregular sparse structure (different numbers of zeros between successive non-zero elements).

(ii) layer by layer, convolving the output of each layer except the last layer with the next spreading function. This approach uses only short and sparse spreading functions to perform the convolutions and thus is computationally efficient. For example, in FIGS. 5-7 below this approach is used to create a pulse with 1703 samples by using a kernel of length 55 and two sparse functions, one with five non-zero elements and the other with thirteen non-zero elements. The output of the first layer is relatively short, having a length of only 155 samples. This makes the convolution of the output of the first layer with the second spreading function (which has a very large sparsity of 129 and only thirteen non-zero elements) especially efficient. In that example, the layers are applied in order of increasing sparsity. It also is possible to perform an exhaustive search to find the most computationally efficient layer order. Note that the number of possible designs for N layers is N! For a typical design of two layers there are just two variants to compare. With three layers there are six variants to compare.

Note the difference of the signal construction of the present invention from the conventional signal construction. As an example, observe the single layer construction. In the prior art design, the separation of the "bits" [or the spreading coefficients $s_m$] and the shape of the kernel are governed by just one and thus the same parameter, $t_b$. Typically, $t_b$ corresponds to length of the shape as it is observed for the rectangular shape of (eq. 2A), or corresponds to the time interval from the peak value to the first zero-crossing as for the Gaussian-windowed sine function of (eq. 2B).

For non-rectangular shapes and/or non-binary spreading sequences the usage of the same parameter for the spreading coefficients separation and for the shape function may lead to non-optimal energy of the resulting constructed signal.

Thus the sparsity set $\{D_1, \ldots, D_n\}$ [or the single parameter $D_1$, in the simplest one-layer case] may be used [as parameters or degrees-of-freedom] for energy maximization of the constructed signal.

The sparsity set $\{D_1, \ldots, D_N\}$ also governs the total length of the signal. The analytical relation for the pulse length is given by (eq. A2) of Appendix A. This is a very important property and it addresses challenge i-2 above, the need of pulses of different lengths for acoustic ranging and direction finding pulses, in particular in silo applications. Recall that this requirement follows from the fact that the upper surface of the silo contents is dynamic and may change its distance from the ceiling of the silo during the silo operation from several tens of centimeters to several tens of meters and back.

Energy maximization of the signal can be also done under signal length constraint. Signal energy maximization subject to signal length constraint can be done by several methods, including an exhaustive search over sparsities.

In the prior art, the parameter of the kernel implicitly defines the bandwidth of the kernel, for example $$G(f) = \frac{\sin^2(\pi f t_b)}{(\pi f t_b)^2}$$

for the rectangular pulse kernel of (eq. 2A), or for the sharper spectrum of the kernel of (eq. 2B), just as this parameter defines the time-spacing between the spreading coefficients. In contrast, the design of the present invention has the advantage of making no connection between the spectrum kernel requirements and the sparsities: the kernel shape has to be chosen to satisfy the frequency constraints, while the sparsities are degrees of freedom that satisfy other requirements for the pulse, such as those mentioned above.

Note that if the spreading filters are chosen to have good autocorrelation properties, this usually implies that their spectra are relatively flat, and thus they preserve the same flatness for any value of the sparsities. This also simplifies the pulse design procedure, since it allows designing the kernel and the spreading filters separately.

Comparison of the Signal Design of the Present Invention with the Prior Art

The innovative method of using sparse spreading filters that is presented herein is considerably more general than the nested or concatenated Barker or other binary codes of the Prior Art. The method presented herein also includes these codes as special cases.

First, the nesting of the prior art essentially implies the usage of binary sequences, for although a binary sequence may be "nested" into other binary sequence; the nesting of a sequence into a non-binary sequence is not defined, while in the signal construction of the present invention any arbitrary [and thus not necessarily binary] sequence may be used for the spreading filters.

Second, the nesting operation demands an exact rigid set of sparsity parameters with no overlapping allowed. Contrary to this rigidity, the signal construction of the present invention may use any set of sparsity parameters.

Thus, while the conventional pulse construction uses nesting, the present invention uses sparse convolution, which is considerably more general and can be applied to any type of sequence and places no restrictions upon the sizes of the used sequences.

The following example demonstrates that the nested codes are a particular case of sparse spreading filters. Consider Barker 5 and Barker 13. The nesting of Barker 5 into Barker 13 also may be done by convolution, or by z-transform, as:

$$\text{nested\_code\_5} \times 13(z) = b_5(z) b_{13}(z^5) \text{[the length is } 5 \times 13 = 65\text{]}$$

In general, to nest a binary sequence whose z-transform is $a(z)$ in another binary sequence whose z-transform is $b(z)$, sparse convolution may be used, as follows:

$$\text{nested\_}axb(z) = a(z) b(z^{L_a})$$

Here, $L_a$ is the length of the sequence whose z-transform is $a(z)$. In the above example, $a(z)$ is Barker 5 and $L_a = 5$. Note that the length of the nested construction above is given by the product of the lengths of its components: if $L_b$ is the length of the sequence whose z-transform is $b(z)$ then the length of the sequence whose z-transform is nested_axb(z) is $L_a L_b$.

Consider, now, as an example, the nesting of a rectangular kernel that consists of D consecutive 1's. The kernel shape is $$S(z) = rec(z, D) = 1 + \ldots + z^{-(D-1)} = \sum_{k=0}^{D-1} z^k$$

The sparsity D must be inserted into the nested code to construct the sparse nested code $$F(z) = \text{sparse\_nested\_code}(z) = \text{nested\_code\_5} \times 13(z^D) = b_5(z^D) b_{13}(z^{5D})$$

Hence, the spreading filters for this nested Barker code are $F_1(z) = b_5(z)$ and $F_2(z) = b_{13}(z)$ and the signal is constructed in the z-transform domain as $$sig(z) = rec(z, D) \cdot F_1(z^D) \cdot F_2(z^{5 \cdot D})$$

The length of the corresponding time sequence is $D \times 5 \times 13$ samples. A general code may be written as:

$$sig(z) = S(z, D) \cdot F(z) = rec(z, D) \cdot b_5(z^{D_1}) \cdot b_{13}(z^{D_2})$$

This general code has parameters $\{D, D_1, D_2\}$ and is much richer than the nested code that has only one parameter, D. The spreading sequences of the present invention represent sparse nested sequences only for a very specific relationship of the sparsities: $5D_1 = D_2$ for sparse $b_5$ to be nested into sparse $b_{13}$ or $13 D_1 = D_2$ for sparse $b_{13}$ to be nested into sparse $b_5$. For example, the spreading filter product $b_5(z^{25}) b_{13}(z^{129})$ does not represent a sparse nested code.

Even in the cases where the sparsity parameters of the sparse filters are related such that sparse convolution [when applied to binary sequences] brings the same result as the nested code, the pulse construction of the present invention still has the sparsity of the sparse nested code [e.g. $D_1$ in the example $b_5(z^{D_1}) b_{13}(z^{5 \cdot D_1})$] independent of the kernel length that is used [e.g., D in the above example]. This thus allows optimization for total pulse length and/or pulse energy by varying this parameter, as a degree of freedom. This is an essentially new element which was not present in the prior art.

Also recall that in the prior art, changing "$t_b$" [or the bit length $L_b = t_b / T_s$] simultaneously changes the spectrum of the signal, which may be undesirable or even prohibited for some applications.

The appended claims explicitly exclude the special prior art cases from their scope. These prior art cases are described as signals constructed from convolution of a kernel (rectangular or non-rectangular), parametrized by the bit length parameter $L_b$, with a sparse spreading sequence whose sparsity is equal to $L_b$. As an example of a non-rectangular kernel the Gaussian-windowed sine function of equation 2B has a length equal to $4 \cdot L_b$ since it has support $[-2t_b, 2t_b]$ but its bit length is $L_b$.

For example, the signal constructed by nesting a rectangular kernel of length $L_b$ into Barker 5, $$sig(z) = rec(z, L_b) b_5(z^{L_b})$$

is excluded. Concerning the multi-stage signal construction, the prior art is restricted to nesting of a rectangular kernel of length $L_b$ into sparse (with resulting sparsity $L_b$) nested binary sequences. For example, sparse nesting of Barker 5 into Barker 13, convolved with a rectangular pulse of length $L_b$, $$sig(z) = rec(z, L_b) \cdot b_5(z^{L_b}) b_{13}(z^{5 \cdot L_b})$$

is excluded.

First Receiver Processing: Deconvolution of the Layers

The received signal, rx_sig(z) in the z-transform domain, is processed with the de-convolution filters $K_k(z^{D_k})$, which also are called keys herein. Each key has its own sparsity which equals, and so corresponds exactly to, the sparsity of the corresponding spreading filter. The resulting deconvolved signal, in the z-transform domain, is:

$$dsig(z) = rx\_sig(z) \cdot K_1(z^{D_1}) \cdot K_2(z^{D_2}) \cdot \ldots \cdot K_N(z^{D_N}) \quad \text{(eq. 3.3)}$$

In this relation, $K_m(z)$ is a [non-sparse] mis-matched filter for the [non-sparse] spreading filter $F_m(z)$. This mis-matched filter serves as a template.

From Appendix B, it follows that a sparse spreading filter, $K_m(z^{D_m})$ with any sparsity $D_m$, is the mis-matched filter for $F_m(z^{D_m})$. This explains equation (eq. 3.1).

Denoting the length of the template for the mis-matched filter as $$L_m = \text{length}(F_m(z))$$

then the sparse mis-matched filter has length $$\text{length}(F_m(z^{D_m})) = 1 + (L_m - 1) \cdot D_m$$

For sparsities of 100 or more this leads to very long filters [see also the example below]. However, despite their extremely long lengths, these filters have small numbers ($L_m$) of non-zero coefficients. Thus the sparsity leads to high computational efficiency, when the filter is applied. The storage of such filters is also very convenient, since only the template of length $L_m$ has to be stored.

Many scalings are possible. The following is one of them: one may assume that these filters are scaled in such a way as to result in no amplification of the white noise:

$$\text{norm}(K_1(z^{D_1}) \cdot K_2(z^{D_2}) \cdot \ldots \cdot K_N(z^{D_N})) = 1 \quad \text{(eq. 3.4)}$$

After the de-convolution by the keys, the resulting dsig(z) is very close to the original scaled kernel shape S(z). This means that relative to S(z), disig(z) is scaled, shifted in time by some delay and has some insignificant small ripples around it. dsig(z) has increased SNR [relative to rx_sig(z)]. (see Appendix 13 for discussion of delay and gain calculations).

As an example, consider a non-nested pair of sparse spreading filters $b_5(z^{25}) b_{13}(z^{129})$ used for pulse construction. To de-convolve these spreading filters we use the following pair of Keys: $K_5(z^{25}) K_{13}(z^{129})$, where $K_5(z)$ is the mis-matched filter to $b_5(z)$ and $K_{13}(z)$ is the mismatched filter to $b_{13}(z)$. Assume, just as an example, that the filter $K_5(z)$ has 24 elements and that the filter $K_{13}(z)$ has 42 elements, to obtain a PSL level of about −40 dB. The construction of the mis-matched filters is known in the prior art and so need not be elaborated here. Total length of the mis-matched filter is prohibitive if the mis-matched filter has to be directly calculated and processed: $(23*25 + 41*129) + 1 = 5865$ elements.

Note also that such large filters may demand very large resolution in bits. However, a filter with only 42 non-zero elements has to be applied first [the application of $K_{13}(z^{129})$] and a filter with only 24 non-zero elements has to be applied after it [the application of $K_5(z^{25})$]. This indeed gives a very effective sparse layer-by-layer de-convolution.

Second Receiver Processing: Kernel Post-Processing

As mentioned above, the resulting dsig(z) corresponds to the original scaled kernel shape S(z) at some total delay D [see (eq. C2)] flanked by some negligible ripples [see (eq. C1)].

The next step is the processing of the kernel. This step may be performed in many different ways and which are not elaborated herein. The kernel processing is a separate art. What is important here, is that any known or developed method may be applied now to the kernel processing.

The problem of pulse processing thus is split by the present invention into two steps: the first is the de-convolution of the long ranging pulse by using sparse key filters, resulting in a short-in-time kernel with an enlarged SNR, and the second step is the further processing of this kernel.

Just as an example, linear processing can be chosen. Linear processing is represented in the z-transform domain by a multiplication of dsig(z) from the first step by some filter M(z):

$$out(z) = dsig(z) \cdot M(z) \quad \text{(eq. 3.5A)}$$

Here, for example, one may use the matched filter of the kernel shape as an option for the filter M(z):

$$M(z) = MF[S(z)]] \quad \text{(eq. 3.5B)}$$

One may also use conventional Weiner filtering.

The filtering operation may be done in the time domain by time-convolution, or in the z-transform domain by multiplication, as it is known to those skilled in digital signal processing.

While the matched filtering or the Wiener filtering are well-known established techniques, the innovation here is that these filtering operations are applied to just the recovered kernel and not to the whole received signal. Among other advantages, the is present partitioning between, the deconvolution of the spreading filters and the deconvolution of the kernel avoids the use of the long mismatched filters of [LEVANON 2005] that are mentioned in the Field and Background section.

The filter M(z) can also incorporate knowledge about the noise distribution in the acoustic environment [e.g. in the silo] to filter out the most dominant noise frequencies [e.g. low frequencies in the silo environment].

EXAMPLES

Figure 5:
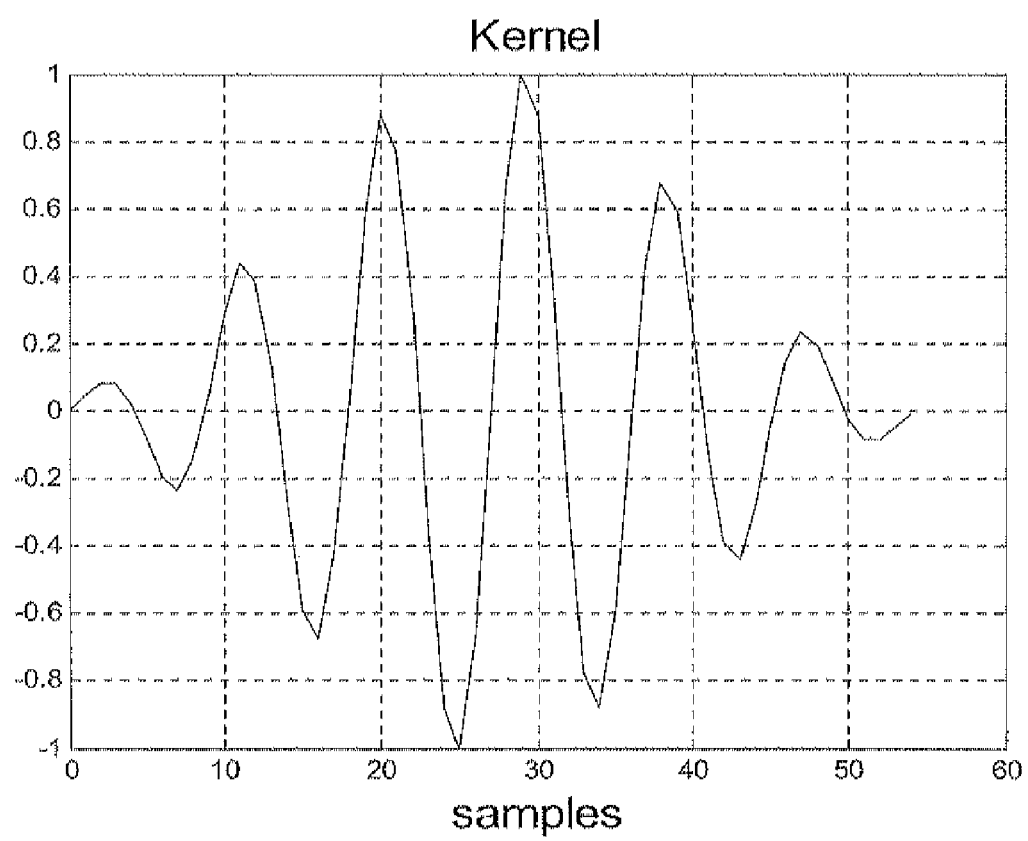
FIG. 5 is an example of a kernel.
Figure 6:
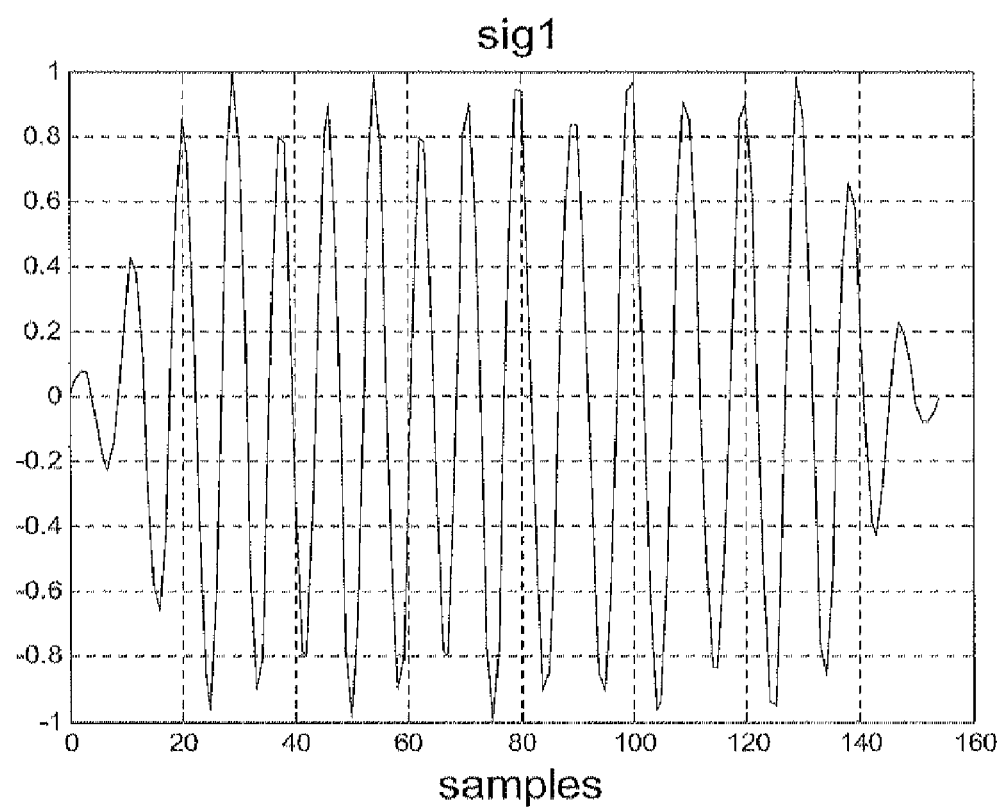
FIGS. 6 and 7 show pulse construction by convolving the kernel of FIG. 5 with sparse sequences constructed from Barker 5 with a sparsity of 25 and from Barker 13 with a sparsity of 129.
Figure 7:
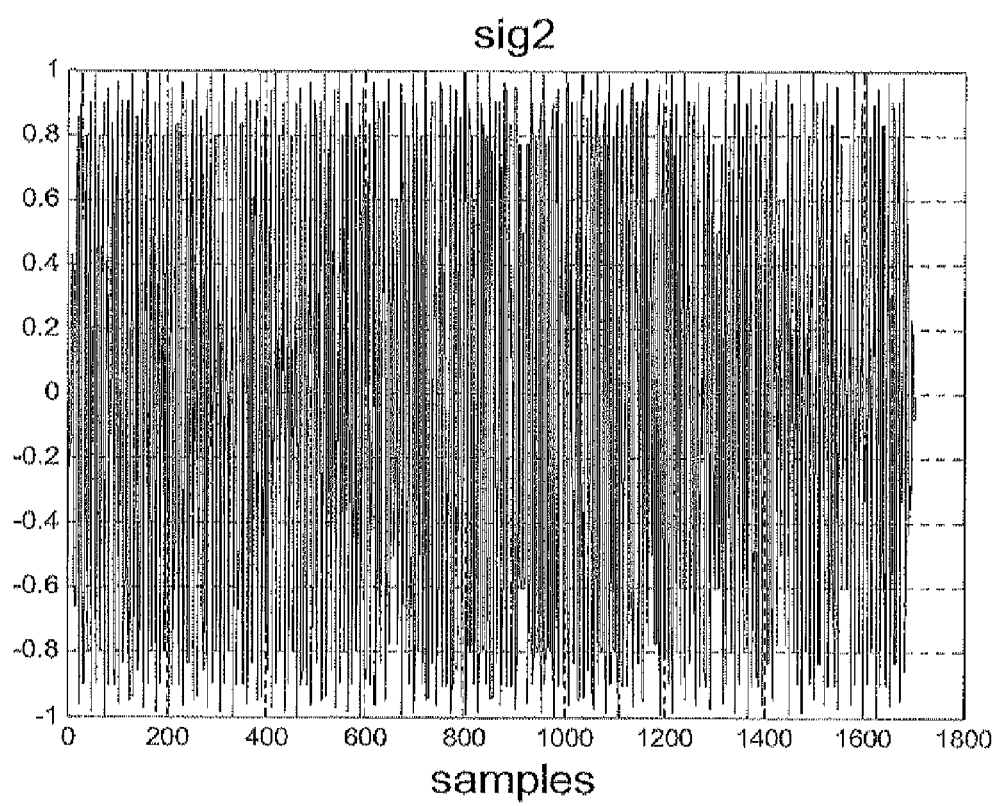

For the kernel shown in FIG. 5, a two-layered design, based upon the two spreading functions sparse Barker 5 sequence with a sparsity of 25 and sparse Baker 13 sequence with a sparsity of 129, is presented. These two spreading functions have, respectively, only five and thirteen non-zero elements. This makes the layered convolution pulse construction very efficient. The corresponding spreading filters are $F_1 = b_5(z^{25})$ and $F_2 = b_{13}(z^{129})$. The first layer of pulse construction represents convolution of the kernel with the sparse spreading filter $F_1$ and is shown in FIG. 6. The second layer represents convolution of the first layer with the sparse spreading filter $F_2$ and is shown in FIG. 7. Note that at every pulse construction stage the amplitude is scaled to have unit absolute maximal value.

Denote the length as "L" samples, energy as "E" [the sum of the squares of the amplitudes], and power as "P", P=E/L. The signal is scaled to the maximal unit amplitude at every stage. Then for this example:

$0^{th}$ stage: the kernel alone: L=55, E=11.582, P=0.21
$1^{st}$ stage, layer 1: L=155 samples, E=54.617, P=0.35
$2^{nd}$ stage, layer 2: L=1703 samples, E=710.03, P=0.417

The maximal power of any sine-modulated shape [having its maximal amplitude limited to 1] is P=0.5, which represents the upper limit for the power. In this example, both the energy of the pulse and the power of the pulse increase at every stage of the pulse design.

Figure 8:
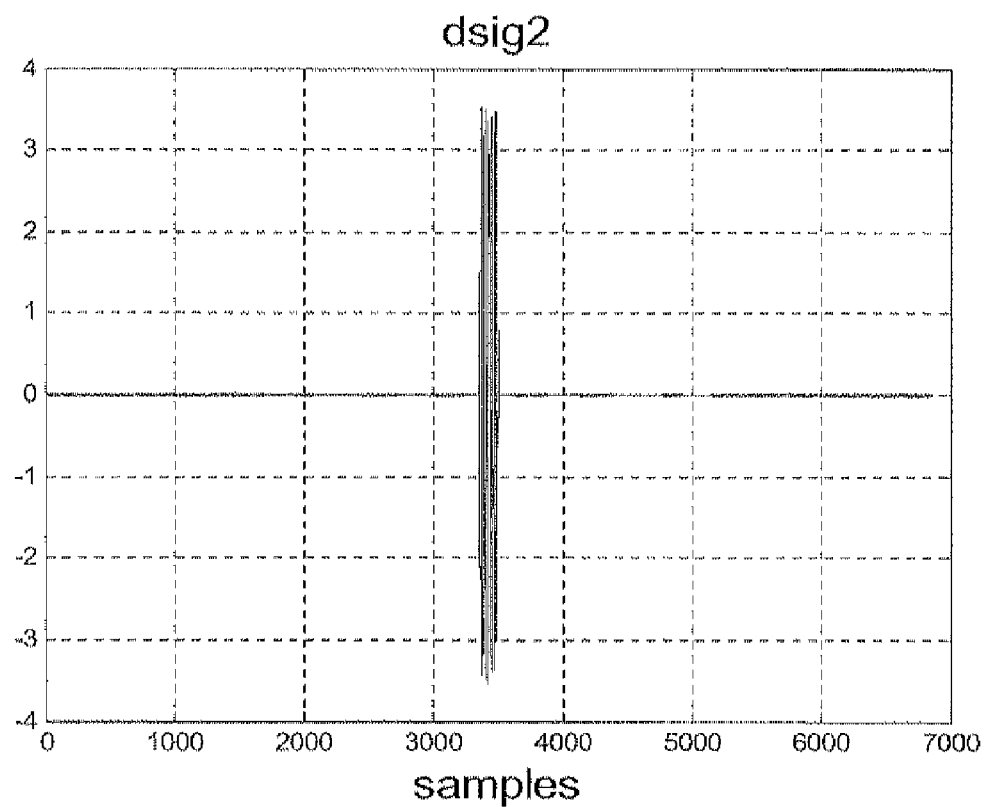
FIGS. 8-10 illustrate deconvolutional compression of the pulse constructed in FIGS. 3-5.
Figure 9:
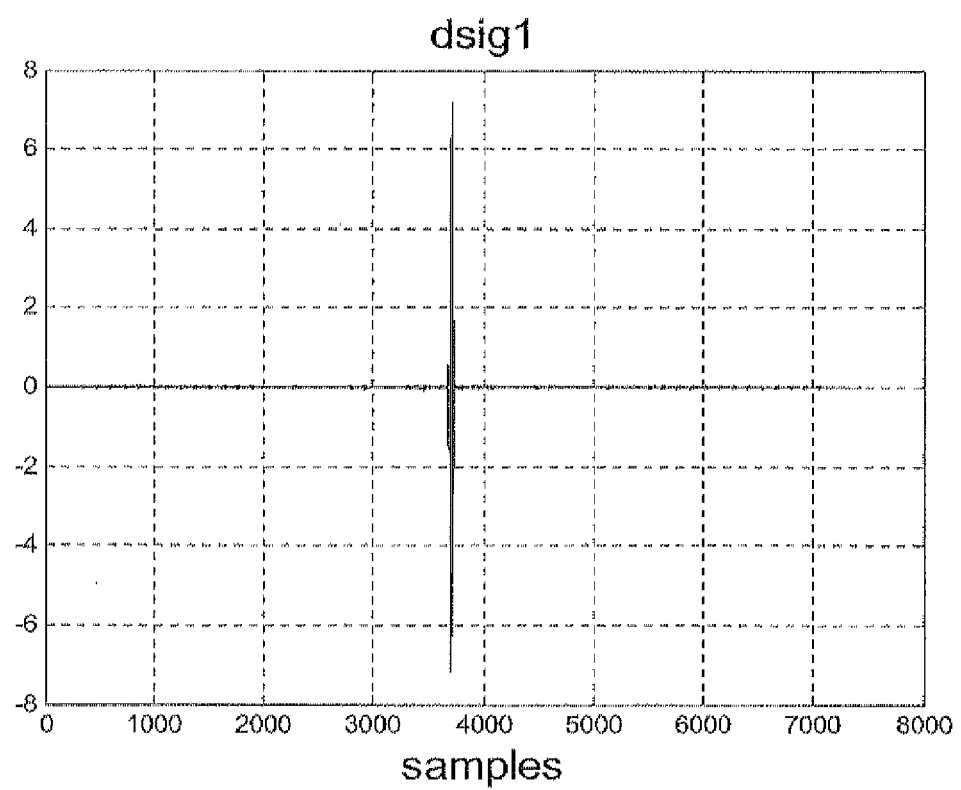
Figure 10:
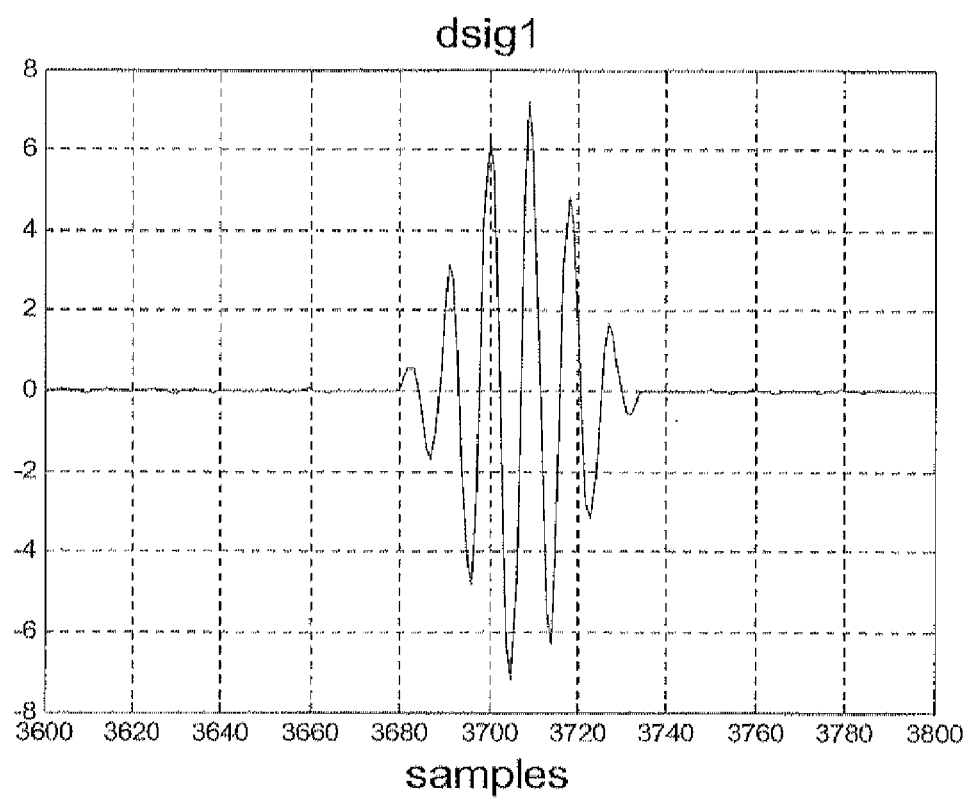

The first stage of the receiver processing including two layers of de-convolution for this two-stage design is further shown in FIGS. 8 and 9. The resulting kernel is shown in FIG. 10. This Kernel is identical [up to the scaling due to increased gain] to the initial Kernel flanked by some small ripples.

Figure 11:
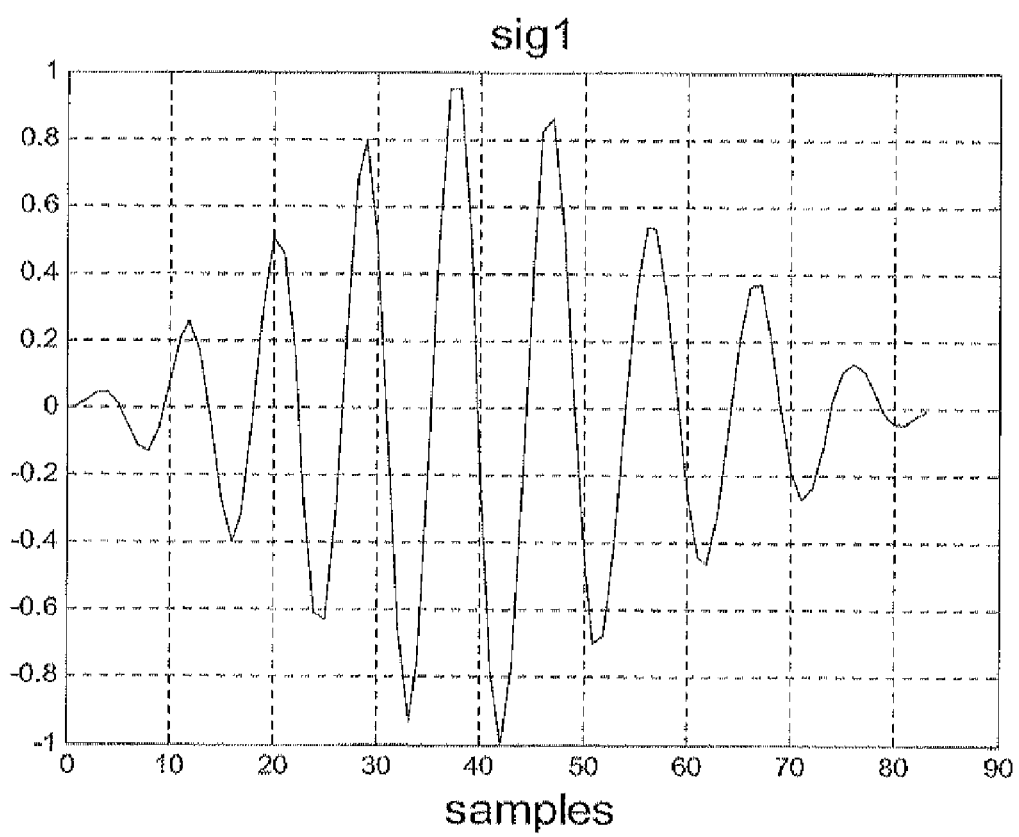
FIGS. 11 and 12 show pulse construction by convolving the kernel of FIG. 5 with sparse sequences constructed from Barker 5 with a sparsity of 7 and from Barker 13 with a sparsity of 41.
Figure 12:
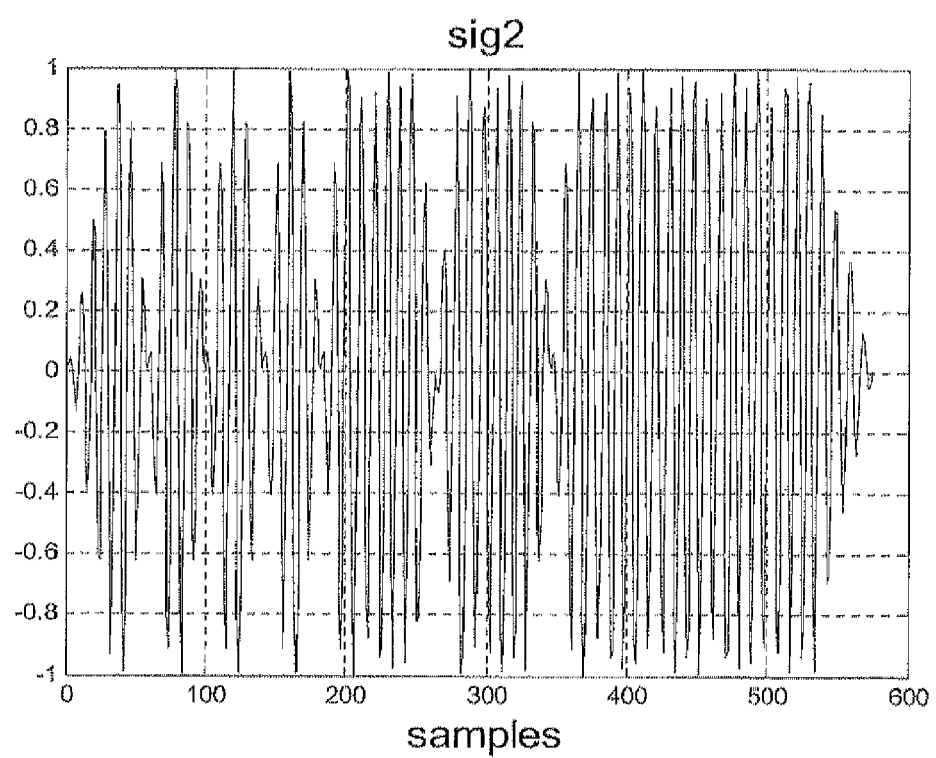

Another example is based upon the kernel of FIG. 5 but using shorter sparse spreading sequences. The corresponding spreading filters are $F_1=b_5(z^7)$ and $F_2=b_{13}(z^{41})$. The first stage of pulse construction is shown in FIG. 11, and the second stage is shown in FIG. 12. The final pulse length is given by (eq. B2): L=55+4*7+12*41, which leads to L=575. The pulse constructed in this manner is shorter than the pulse of FIG. 7. This is achieved by using smaller values of the sparsity parameters: 7 and 41 instead of 25 and 129.

System

Figure 13:
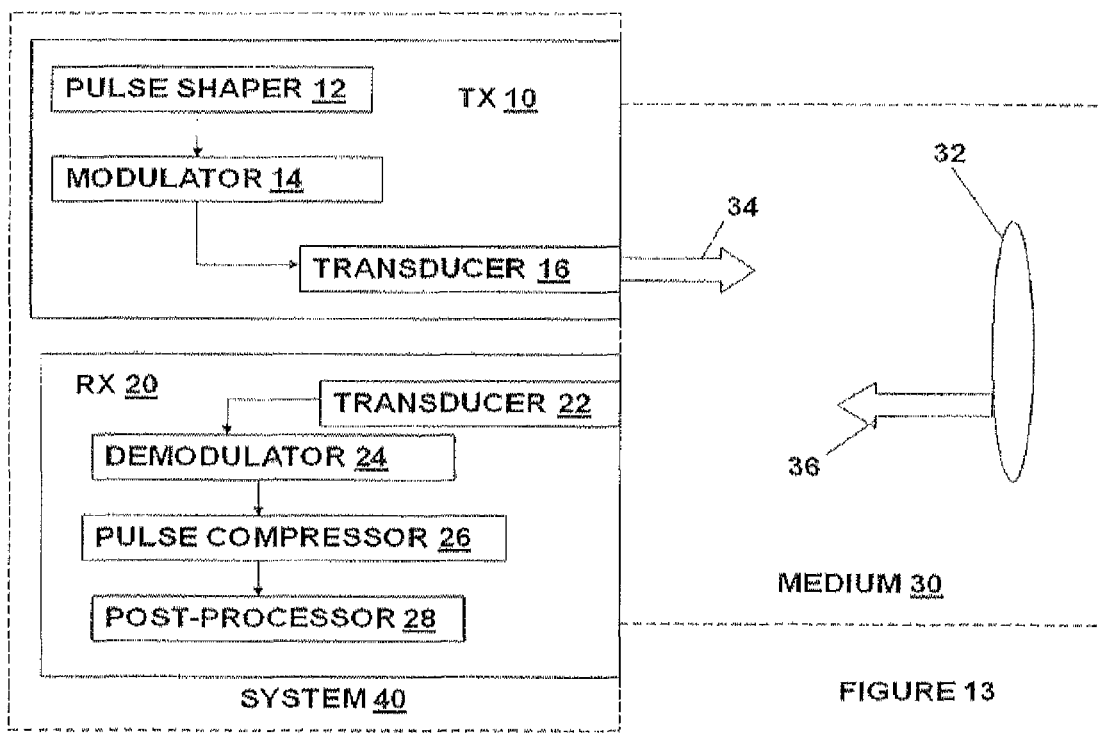
FIGS. 13 and 14 show systems of the present invention for measuring a range to a target in a propagation medium.

FIG. 13 illustrates a range and direction finding system 40 of the present invention. System 40 includes a transmitter 10 and a receiver 20. Transmitter 10 in turn includes a pulse shaper 12, a modulator 14 and a transducer 16. Receiver 20 in turn includes a transducer 22, a demodulator 24, a pulse compressor 26 and a post-processor 28. Pulse shaper 12 generates a baseband pulse from a kernel as described above. Modulator 14 modulates a carrier wave with the baseband pulse. Transducer 16 launches the modulated carrier wave, into a medium 30 that supports propagation of the carrier wave, as a transmitted signal 34, towards a target 32. Transmitted signal 34 is reflected from target 32 as a reflected signal 36 that is received by transducer 22. Demodulator 24 demodulates the received reflection to provide a received representation of the baseband pulse. What is demodulated by demodulator 24 is only a representation of the baseband pulse because it is not identical to the baseband pulse, having been distorted e.g. by propagation noise in medium 30. Pulse compressor 26 compresses the representation of the baseband pulse by deconvolution as described above. The pulse compression provides a compressed pulse that is a time-shifted representation of the original kernel. Post-processor 28 applies post-processing as described above to the compressed pulse and infers the range to target 32 as one-half of the product of the round-trip travel time of signals 34 and 36 and the propagation speed of signals 34 and 36 in medium 30.

System 40 as drawn is, strictly speaking, a ranging system, not a range and direction finding system. A true ranging and direction finding system would include several transmitters 10 and/or several receivers 20, and the post-processing would include DOA determination, for example by beamforming, as in U.S. Ser. No. 10/571,693.

In radar applications, signals 34 and 36 are radio-frequency electromagnetic signals, medium 30 typically is free space, and transducers 16 and 22 are antennas. In applications such as lidar that use optical frequencies, signals 34 and 36 are optical-frequency electromagnetic signals, medium 30 typically is free space, transducer 16 typically is a laser or a light-emitting diode, and transducer 22 is a photodetector. In acoustic ranging applications, signals 34 and 36 are acoustic signals, medium 30 typically is a gas such as air or a liquid such as water or a mixture thereof such as a foam, transducer 16 is a speaker and transducer 22 is a microphone. In medical ultrasound applications, signals 34 and 36 are ultrasound signals, medium 30 is biological tissue, and transducers 16 and 22 typically are piezoelectric transducers. In seismic exploration, signals 34 and 36 are seismic signals, medium 30 is the Earth, transducer 16 typically is a seismic vibrator and transducer 18 is a geophone.

Figure 14:
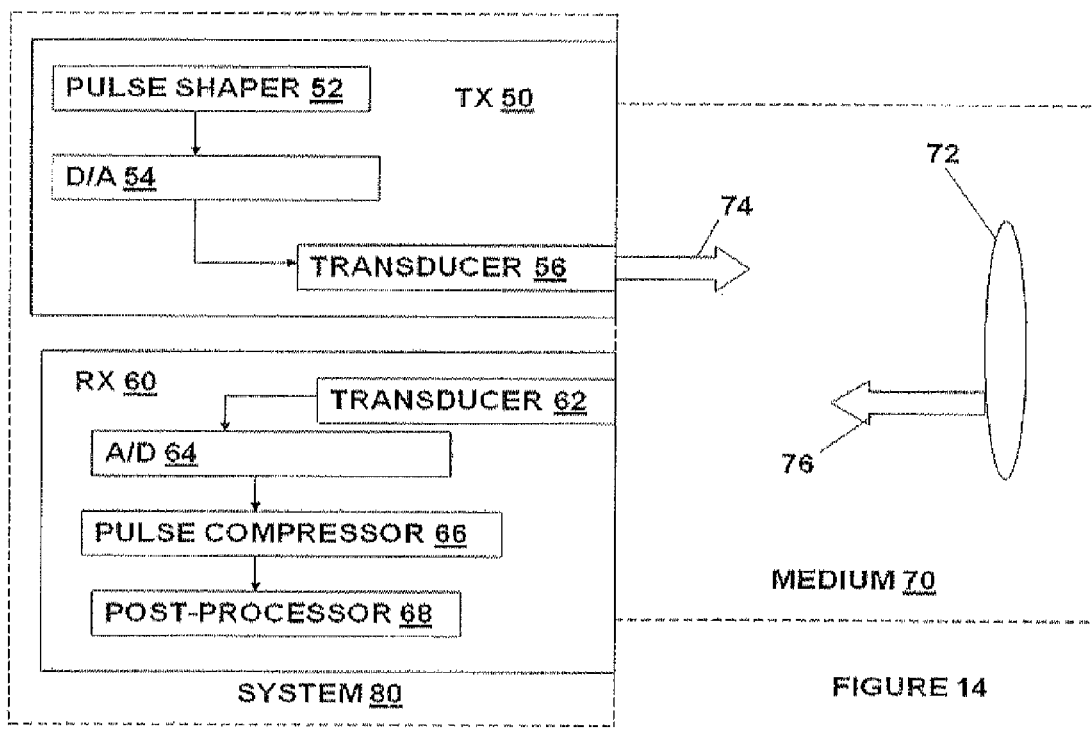

FIG. 14 illustrates another range and direction finding system 80 of the present invention. System 80 includes a transmitter 50 and a receiver 60. Transmitter 50 in turn includes a pulse shaper 52, a digital-to-analog converter 54 and a transducer 56. Receiver 60 includes a transducer 62, an analog-to-digital converter 64, a pulse compressor 66 and a post-processor 68. Pulse shaper 52 generates a passband pulse from a kernel as described above. Digital-to-analog converter 54 converts the passband pulse to an analog transmitted pulse. Transducer 56 launches the transmitted pulse into a medium 70 as a transmitted signal 74 toward a target 72. Like medium 30, medium 70 supports propagation of signal 74. Signal 74 is reflected from target 72 as a reflected signal 76 that is received by transducer 62. Analog-to-digital converter 64 converts the received reflected signal to a digital received representation of the passband pulse. Similar to the output of demodulator 24 of system 40, the output of analog-to-digital converter 64 is only a representation of the passband pulse because it is not identical to the passband pulse, having been distorted e.g. by propagation noise in medium 70. Pulse compressor 66 compresses the representation of the passband pulse by deconvolution as described above. The pulse compression provides a compressed pulse that is a time-shifted representation of the original kernel. Post-processor 68 applies post-processing as described above to the compressed pulse and infers the range to target 72 as one-half of the product of the round-trip travel time of signals 74 and 76 and the propagation speed of signals 74 and 76 in medium 70.

System 80 as drawn is, strictly speaking, a ranging system, not a range and direction finding system. A true ranging and direction finding system would include several transmitters 50 and/or several receivers 60, and the post-processing would include DOA determination, for example by beamforming, as in U.S. Ser. No. 10/571,693.

Concluding Remarks

One important feature of the input pulse of the present invention is that the extend to which the length of the input pulse (in time, or in distance after multiplying the length in time units by the propagation speed (e.g. the speed of light for radar pulses) or in numbers of samples) exceeds the length of the kernel is not determined by the length of the kernel. This is in contrast to the prior art, in which nesting the kernel in a spreading sequence necessarily produces an input pulse whose length is an integral multiple of the length of the kernel. (eq. A2) in Appendix A below gives the length L of the input pulse in terms of the length $L_0$ of the kernel and the lengths $L_i$ and sparsities $D_i$, i=1, . . . , k) of k spreading sequences. The extent to which L exceeds $L_0$ is determined by the $L_i$ and the $D_i$, parameters that clearly are independent of $L_0$.

While the invention has been described with respect to a limited number of embodiments, it will be appreciated that many variations, modifications and other applications of the invention may be made. Therefore, the claimed invention as recited in the claims that follow is not limited to the embodiments described herein.

APPENDIX A: CONSIDERATIONS OF TOTAL PULSE LENGTH

The length of the pulse given by (eq. 3.1) and constructed by N convolutions is:

$$L = \text{length}(S) + \text{length}(F_1(z^{D_1})) + \ldots + \text{length}(F_N(z^{D_N})) - N$$

Denoting the length of the templates [i.e. the spreading filters having unit sparsity D=1]:

$$L_0 = \text{length}(S), L_k = \text{length}(F_k(z)) \quad \text{(eq. A1)}$$

and since $$\text{length}(F_k(z^{D_k})) = 1 + (L_k - 1) \cdot D_k$$

to the following is obtained:

$$L = L_0 + (L_1 - 1) \cdot D_1 + \ldots + (L_k - 1) \cdot D_k \quad \text{(eq. A2)}$$

For example, for a kernel of length 55 samples and for any spreading functions having templates of length 5 and 13, the pulse length is: $L = 55 + 4 \cdot D_1 + 12 \cdot D_2$. The length in samples can be further re-calculated to the length of the pulse in meters. Denoting the speed of wave propagation as "c" and the sampling rate as "$F_s$", $$L_{meters} = \frac{c}{F_s} L_{samples} \quad \text{(eq. A3)}$$

If the ranging target is the contents of a silo and the minimal distance to the upper surface of the contents of the silo is R [meters], then the signal length has to be twice this value because the signal has to go forth and back. This leads to the constraint:

$$L_{samples} < 2\frac{F_s}{c} R \quad \text{(eq. A4)}$$

which in turn leads to the constraint for the pulse design:

$$L_0 + (L_1 - 1) \cdot D_1 + \ldots + (L_k - 1) \cdot D_k < 2\frac{F_s}{c} R \quad \text{(eq. A5)}$$

Just as an example, for the speed of sound being about 340 m/s and the digital sampling rate of 41,000 Hz, which is close to the sampling rate used for compact disks, $L_{samples}$ is less than $(2 \cdot 41000/340) \cdot R$, or, approximately, $L_{samples} < 241 \cdot R$. Hence for a distance to the upper surface of the silo contents of about 0.4 meters the maximal possible length is about 96 samples, while for a distance of 10 meters the maximal possible length is about 2410 samples.

Finally, note that the two pulses [one longer and one shorter], presented in the above two-layer construction example, and having 1703 samples and 575 samples, may be applied to the case of the target surface being at a distance [or for surfaces situated farther than this distance] of $1703/41000 \cdot 340/2 = 7.06$ meters and $575/41000 \cdot 340/2 = 2.4$ meters, while the kernel of length 55 samples corresponds to a distance of $55/41000 \cdot 340/2 = 0.23$ meters.

APPENDIX B: MISMATCHED FILTER FOR A SPARSE FILTER

The convolution of two filters in the time domain is exactly represented in the z-transform domain by multiplication of two corresponding polynomials. Assume that for F(z) we know [from the prior art] how to construct K(z) such that $$P(z) = F(z) \cdot K(z)$$

has a delta-like behavior, i.e. its inverse z-transform has one large coefficient and all the other coefficients are small. Then, by change of variables z to $z^D$ another polynomial is created:

$$P(z^D) = F(z^D) \cdot K(z^D)$$

that has exactly the same non-zero coefficients [in addition to many newly emerged zero coefficients] and therefore the new polynomial has exactly the same MAX to PEAK ratio, i.e., the same PSL as the first polynomial. Therefore, if K(z) is the mismatched filter for F(z), then $K(z^D)$ is the mismatched filter of the same quality [i.e. having the same PSL] for $F(z^D)$ for any value of D.

APPENDIX C: CALCULATION OF THE TOTAL DELAY AND THE PROCESSING GAIN

To calculate the total delay, assume that the templates (thus with unit sparsity) behave as ("s.r." means small [insignificant] ripples):

$$F_1(z) \cdot K_1(z) \approx G_1 z^{-d_1} + s.r., \ldots, F_N(z) \cdot K_N(z) \approx G_N z^{-d_N} + s.r. \quad \text{(eq. C1)}$$

Then the sparse de-convolution for the pulse constructed by (eq. 3.1) is:

$$dsig(z) = rx\_sig(z) \cdot K_1(z^{D_1}) \cdot K_2(z^{D_2}) \cdot \ldots \cdot K_N(z^{D_N})$$

which is (eq. 3.3). Assuming that the received signal $rx\_sig(z) = A \cdot sig(z) + noise$, and ignoring small ripples of the mismatched filters as well as ignoring the noise term as not relevant for delay calculations, gives [after grouping the sparse spreading filters with the corresponding keys]:

$$dsig(z) \approx A \cdot S(z) \cdot \{F_1(z^{D_1}) \cdot K_1(z^{D_1})\} \cdot \ldots \cdot \{F_N(z^{D_N}) \cdot K_N(z^{D_N})\}$$

Finally, applying (eq. C1) gives:

$$dsig(z) \approx A \cdot S(z) \cdot G_1 z^{-d_1 \cdot D_1} \cdot \ldots \cdot G_N z^{-d_N \cdot D_N} = A \cdot \left(\prod_{k=1}^{N} G_k\right) \cdot S(z) \cdot z^{-\sum_{k=1}^{N} d_k \cdot D_k}$$

This corresponds to the delayed original kernel shape with the new gain. The total delay is calculated as $$D\_total = deconvolution\_delay = \Sigma_{k=1}^{N} d_k \cdot D_k \quad \text{(eq. C2)}$$

and the gain increase is equal to the product of the deconvolution gains:

$$\text{Processing\_gain\_in\_dB} = 20 \cdot \log_{10}(\Pi_{k=1}^{N} G_k) \quad \text{(eq. C3)}$$

Recall that the mismatched filters are to be scaled to not amplify the white noise after their joint application, i.e. according to (eq. 3.4).

What is claimed is:

1. A transmitter comprising:
   (a) a pulse shaper for generating an input pulse that is a convolution of a kernel parametrized by a bit length and a spreading sequence parametrized by at least one parameter pair that consists of a spreading length and a sparsity, wherein said bit length and said at least one parameter pair form an ordered set that satisfies at least one condition selected from the set consisting of:
- (i) a first said sparsity is different from said bit length and
- (ii) when said ordered set includes a plurality of said spreading lengths and said sparsities, then at least one said sparsity subsequent to said first sparsity is different from a product of an immediately preceding spreading length and an immediately preceding sparsity;

(b) a mechanism for transforming said input pulse to a transmitted pulse; and (c) a transducer for launching said transmitted pulse as a signal propagating in a medium.

2. The transmitter of claim 1, wherein said input pulse is a baseband pulse and wherein said mechanism includes a modulator for modulating a carrier wave with said baseband pulse.

3. The transmitter of claim 1, wherein said input pulse is a passband pulse and wherein said mechanism includes a digital-to-analog converter.

4. The transmitter of claim 1, wherein said spreading sequence is parametrized by a plurality of said parameter pairs.

5. The transmitter of claim 1, wherein said signal is electromagnetic.

6. The transmitter of claim 1, wherein said signal is acoustic.

7. A non-contact sensing device, comprising:

(a) a transmitter that includes a pulse shaper for generating an input pulse to be transformed to a transmitted pulse that is launched as a signal that propagates in a medium towards a target, the input pulse being a convolution of a kernel parametrized by a bit length and a spreading sequence parametrized by at least one parameter pair that consists of a spreading length and a sparsity, wherein said kernel length and said at least one parameter pair form an ordered set that satisfies at least one condition selected from the set consisting of:
- (i) a first said sparsity is different from said bit length and
- (ii) when said ordered set includes a plurality of said spreading lengths and said sparsities, then at least one said sparsity subsequent to said first sparsity is different from a product of an immediately preceding spreading length and an immediately preceding sparsity; and (b) a receiver that includes:
- (i) at least one transducer for coupling to said medium to receive a respective reflection of said signal from said target,
- (ii) for each said transducer:
  - (A) a mechanism for transforming said respective received reflection to a respective received representation of said input pulse, and
  - (B) a pulse compressor for deconvolving said spreading sequence from said respective received representation of said input pulse, thereby providing a respective compressed pulse, and
- (iii) a post-processor for post-processing said at least one respective compressed pulse.

8. The device of claim 7, wherein said input pulse is a baseband pulse and wherein each said mechanism includes a demodulator for demodulating said respective received reflection.

9. The device of claim 7, wherein said input pulse is a passband pulse and wherein each said mechanism includes an analog-to-digital converter.

10. The device of claim 7, wherein said post-processing is for obtaining a respective travel time from said transmitter to each said at least one transducer via said target and for inferring a range to said target from said at least one respective travel time.

11. The device of claim 7, wherein said post-processing is for obtaining a direction of arrival of said at least one received reflection.

12. The device of claim 7, wherein said signal is electromagnetic.

13. The device of claim 7, wherein said signal is acoustic.

14. The device of claim 7, wherein said deconvolving is effected using a matched filter.

15. The device of claim 7, wherein said deconvolving is effected using a mismatched filter.

16. A method of transmitting a signal into a medium, comprising the steps of:

(a) generating an input pulse that is a convolution of a kernel parametrized by a bit length and a spreading sequence parametrized by at least one parameter pair that consists of a spreading length and a sparsity, wherein said bit length and said at least one parameter pair form an ordered set that satisfies at least one condition selected from the set consisting of:
- (i) a first said sparsity is different from said bit length and
- (ii) when said ordered set includes a plurality of said spreading lengths and said sparsities, then at least one said sparsity subsequent to said first sparsity is different from a product of an immediately preceding spreading length and an immediately preceding sparsity;

(b) transforming said input pulse to a transmitted pulse; and (c) launching said transmitted pulse into the medium as the signal.

17. A method of non-contact sensing of a target, comprising the steps of:

(a) generating an input pulse that is a convolution of a kernel parametrized by a bit length and a spreading sequence parametrized by at least one parameter pair that consists of a spreading length and a sparsity, wherein said bit length and said at least one parameter pair form an ordered set that satisfies at least one condition selected from the set consisting of:
- (i) a first said sparsity is different from said bit length and
- (ii) when said ordered set includes a plurality of said spreading lengths and said sparsities, then at least one said sparsity subsequent to said first sparsity is different from a product of an immediately preceding spreading length and an immediately preceding sparsity;

(b) transforming said input pulse to a transmitted pulse;

(c) launching said transmitted pulse as a signal propagating in a medium towards the target;

(d) receiving at least one reflection of said signal from said target;

(e) for each said received reflection:
- (i) transforming said each received reflection to a respective received representation of said input pulse, and
- (ii) compressing said respective received representation of said input pulse by deconvolving said spreading sequence from said respective received representation of said input pulse, thereby providing a respective compressed pulse; and (f) post-processing said at least one compressed pulse.

18. A transmitter comprising:
(a) a pulse shaper for generating an input pulse that is a convolution of a kernel and an ordered plurality of spreading sequences, wherein at least one spreading sequence subsequent to a first said spreading sequence is not a binary sequence;
(b) a mechanism for transforming said input pulse to a transmitted pulse; and
(c) a transducer for launching said transmitted pulse as a signal propagating in a medium.

19. The transmitter of claim 18, wherein said input pulse is a baseband pulse and wherein said mechanism includes a modulator for modulating a carrier wave with said baseband pulse.

20. The transmitter of claim 18, wherein said input pulse is a passband pulse and wherein said mechanism includes a digital-to-analog converter.

21. A non-contact sensing device, comprising:
(a) a transmitter that includes a pulse shaper for generating an input pulse to be transformed to a transmitted pulse that is launched as a signal that propagates in a medium towards a target, the input pulse being a convolution of a kernel and an ordered plurality of spreading sequences, wherein at least one spreading sequence subsequent to a first said spreading sequence is not a binary sequence; and
(b) a receiver that includes:
(i) at least one transducer for coupling to said medium to receive a respective reflection of said signal from said target,
(ii) for each said transducer:
(A) a mechanism for transforming said respective received reflection to provide a respective received representation of said input pulse, and
(B) a pulse compressor for deconvolving said spreading sequence from said respective received representation of said input pulse, thereby providing a respective compressed pulse, and
(iv) a post-processor for post-processing said at least one compressed pulse.

22. The device of claim 21, wherein said input pulse is a baseband pulse and wherein each said mechanism includes a demodulator for demodulating said respective received reflection.

23. The device of claim 21 wherein said input pulse is a passband pulse and wherein each said mechanism includes an analog-to-digital converter.

24. The device of claim 21 wherein said post-processing is for obtaining a respective travel time from said transmitter to each said at least one transducer via said target and for inferring a range to said target from said at least one respective travel time.

25. The device of claim 21, wherein said post-processing is for obtaining a direction of arrival of said at least one received reflection.

26. A method of transmitting a signal into a medium, comprising the steps of:
(a) generating an input pulse that is a convolution of a kernel and an ordered plurality of spreading sequences, wherein at least one spreading sequence subsequent to a first said spreading sequence is not a binary sequence;
(b) transforming said input pulse to a transmitted pulse; and
(c) launching said transmitted pulse into the medium as the signal.

27. A method of non-contact sensing of a target, comprising the steps of:
(a) generating an input pulse that is a convolution of a kernel and an ordered plurality of spreading sequences, wherein at least one spreading sequence subsequent to a first said spreading sequence is not a binary sequence;
(b) transforming said input pulse to a transmitted pulse;
(c) launching said transmitted pulse as a signal propagating in a medium towards the target;
(d) receiving at least one reflection of said signal from said target;
(e) for each said received reflection:
(i) transforming said each received reflection to a respective received representation of said input pulse, and
(ii) compressing said respective received representation of said input pulse by deconvolving said spreading sequence from said respective received representation of said input pulse, thereby providing a respective compressed pulse; and
(f) post-processing said at least one compressed pulse.

28. A method of transmitting a signal into a medium, comprising the steps of:
(a) selecting a desired length of an input pulse;
(b) selecting a kernel and a spreading sequence, such that when said kernel is convolved with said spreading sequence without nesting said kernel in said spreading sequence, an output of said convolution is said input pulse having said desired length;
(c) generating said input pulse;
(d) transforming said input pulse into a transmitted pulse; and
(e) launching said transmitted pulse into the medium as the signal.

29. The method of claim 28, wherein said spreading sequence is parametrized by at least one sparsity.

30. A method of transmitting a signal into a medium, comprising the steps of:
(a) generating an input pulse by convolving a kernel with a spreading sequence that is selected so that a length by which said input pulse exceeds a length of said kernel is not determined by said length of said kernel;
(b) transforming said input pulse into a transmitted pulse; and
(c) launching said transmitted pulse into the medium as the signal.

31. A transmitter comprising:
(a) a pulse shaper for generating an input pulse that is a convolution of
(i) a kernel parametrized by a bit length and
(ii) a spreading sequence that is a convolution of a plurality of spreading functions, with each said spreading function parametrized by a respective parameter pair that consists of a spreading length and a sparsity,
wherein said bit length and said parameter pairs form an ordered set that satisfies at least one condition selected from the set consisting of:
(i) a first said sparsity is different from said bit length and
(ii) at least one said sparsity subsequent to said first sparsity is different from a product of an immediately preceding spreading length and an immediately preceding sparsity;
(b) a mechanism for transforming said input pulse to a transmitted pulse; and
(c) a transducer for launching said transmitted pulse as a signal propagating in a medium.

32. The transmitter of claim 31, wherein said pulse shaper is operative to generate said input pulse by a plurality of convolutions equal in number to said plurality of spreading functions, with a first said convolution being a convolution of said kernel with a first said spreading function and each subsequent convolution being a convolution of an output of an immediately preceding convolution with a next said spreading function.

33. A non-contact sensing device, comprising:

(a) a transmitter that includes a pulse shaper for generating an input pulse to be transformed to a transmitted pulse that is launched as a signal that propagates in a medium towards a target, the input pulse being a convolution of (i) a kernel parametrized by a bit length and (ii) a spreading sequence that is a convolution of a plurality of spreading functions, with each said spreading function parametrized by a respective parameter pair that consists of a spreading length and a sparsity, wherein said kernel length and said parameter pairs form an ordered set that satisfies at least one condition selected from the set consisting of:

(i) a first said sparsity is different from said bit length and (ii) at least one said sparsity subsequent to said first sparsity is different from a product of an immediately preceding spreading length and an immediately preceding sparsity; and (b) a receiver that includes:

(i) at least one transducer for coupling to said medium to receive a respective reflection of said signal from said target, (ii) for each said transducer:

(A) a mechanism for transforming said respective received reflection to a respective received representation of said input pulse, and (B) a pulse compressor for deconvolving said spreading sequence from said respective received representation of said input pulse by a plurality of deconvolutions that is equal in number to said plurality of spreading functions, with a first said deconvolution being a deconvolution of a last said spreading function from said respective received representation of said input pulse and each subsequent said deconvolution being a deconvolution of a preceding said spreading function from an output of an immediately preceding deconvolution, thereby providing a respective compressed pulse, and (iii) a post-processor for post-processing said at least one respective compressed pulse.

34. The device of claim 33, wherein each said deconvolution is effected using a respective key whose sparsity is equal to said sparsity of said spreading sequence that said respective key deconvolves.

* * * * *